US010768055B2

(12) United States Patent
Miller

(10) Patent No.: US 10,768,055 B2
(45) Date of Patent: *Sep. 8, 2020

(54) DEVICE AND METHOD OF CALIBRATING FIBER BRAGG GRATING BASED FIBER OPTIC OVERHEAT SYSTEMS

(71) Applicant: Kidde Technologies, Inc., Wilson, NC (US)

(72) Inventor: Mark Sherwood Miller, Lakeville, MN (US)

(73) Assignee: Kidde Technologies, Inc., Wilson, NC (US)

( * ) Notice: Subject to any disclaimer, the term of this patent is extended or adjusted under 35 U.S.C. 154(b) by 212 days.

This patent is subject to a terminal disclaimer.

(21) Appl. No.: 15/913,664

(22) Filed: Mar. 6, 2018

(65) Prior Publication Data

US 2019/0277708 A1 Sep. 12, 2019

(51) Int. Cl.
*G01K 11/32* (2006.01)
*G01K 15/00* (2006.01)
(Continued)

(52) U.S. Cl.
CPC ..... *G01K 11/3206* (2013.01); *G01D 5/35316* (2013.01); *G01D 18/00* (2013.01);
(Continued)

(58) Field of Classification Search
CPC ............. G01K 11/3206; G01K 15/005; G01D 5/35316; G01D 18/00; G01L 1/246;
(Continued)

(56) References Cited

U.S. PATENT DOCUMENTS 6,281,431 B1 * 8/2001 Cumley ............... G02B 6/4446
174/25 G
6,417,507 B1 7/2002 Malvern et al.
(Continued)

FOREIGN PATENT DOCUMENTS

WO WO2016/086310 A1 6/2016

OTHER PUBLICATIONS

Extended European Search Report for EP Application No. 19159525. 5, dated Jul. 18, 2019, 7 pages.

*Primary Examiner* — Lisa M Caputo
*Assistant Examiner* — Philip L Cotey
(74) *Attorney, Agent, or Firm* — Kinney & Lange, P.A.

(57) ABSTRACT

A system configured to monitor a plurality of zones of an aircraft includes a line replaceable unit, a first interrogator, and a controller. The line replaceable unit includes first and second connectors in optical communication and an optical fiber. The optical fibers includes a first plurality of fiber Bragg gratings and a plurality of calibration fiber Bragg gratings in a pattern providing information related to a calibration value based upon a center wavelength of each of the first plurality of fiber Bragg gratings. The first interrogator is connected to the line replaceable unit at the first end of the optical fiber and is configured to provide a first optical signal and to receive a first optical response signal from the optical fiber. The controller is operatively connected to the first interrogator and is configured to determine the calibration value of the line replaceable unit.

18 Claims, 10 Drawing Sheets

(51) Int. Cl.
   *G01L 1/24*     (2006.01)
   *G02B 6/02*     (2006.01)
   *G02B 6/12*     (2006.01)
   *G01D 18/00*    (2006.01)
   *G01D 5/353*    (2006.01)

(52) U.S. Cl.
   CPC ............ *G01K 15/005* (2013.01); *G01L 1/246* (2013.01); *G02B 6/02076* (2013.01); *G02B 6/12007* (2013.01); *G02B 2006/12107* (2013.01)

(58) Field of Classification Search
   CPC ............ G02B 6/02076; G02B 6/12007; G02B 2006/12107
   See application file for complete search history.

(56) References Cited

U.S. PATENT DOCUMENTS

| | | | |
|---|---|---|---|
| 6,449,047 B1* | 9/2002 | Bao .................. | G01D 5/35383 356/478 |
| 6,571,027 B2 | 5/2003 | Cooper et al. | |
| 6,807,324 B2 | 10/2004 | Pruett | |
| 7,512,291 B2 | 3/2009 | Mendoza | |
| 7,769,252 B2 | 8/2010 | Taverner et al. | |
| 8,571,409 B1* | 10/2013 | Wang ................ | G01K 11/3206 398/43 |
| 9,677,957 B2 | 6/2017 | Dong et al. | |
| 9,759,585 B2 | 9/2017 | Holland et al. | |
| 9,766,371 B2 | 9/2017 | Barfoot et al. | |
| 9,846,259 B2 | 12/2017 | LeBlanc | |
| 10,584,982 B2* | 3/2020 | Handerek ......... | G01D 5/35383 |
| 2001/0026362 A1* | 10/2001 | Gleine ............... | G01K 11/3206 356/32 |
| 2005/0089081 A1* | 4/2005 | Dammann ........... | B64D 45/00 374/161 |
| 2007/0280605 A1* | 12/2007 | Mendoza .......... | G01D 5/35383 385/92 |
| 2011/0231135 A1 | 9/2011 | Suh et al. | |
| 2013/0311007 A1* | 11/2013 | Phan ................. | B64D 45/00 701/3 |
| 2013/0322490 A1* | 12/2013 | Bell .................. | G01K 11/3206 374/161 |
| 2014/0233020 A1* | 8/2014 | Goldner ............ | H04J 14/02 356/73.1 |
| 2014/0303816 A1* | 10/2014 | Phan ................. | B64D 45/00 701/3 |
| 2015/0177132 A1* | 6/2015 | Pechstedt .......... | G01N 33/22 356/517 |
| 2015/0192476 A1* | 7/2015 | Smith ............... | G01K 5/483 374/161 |
| 2015/0285683 A1* | 10/2015 | Ouellette .......... | G01D 5/35383 356/451 |
| 2016/0041065 A1* | 2/2016 | L'Heureux ........ | G01M 11/3154 356/73.1 |
| 2017/0021914 A1* | 1/2017 | Small ............... | G01K 11/3206 |
| 2017/0138802 A1* | 5/2017 | Fisk ................. | G01K 13/00 |
| 2017/0334575 A1* | 11/2017 | Wilson ............. | B64D 45/00 |
| 2017/0336269 A1 | 11/2017 | Wilson et al. | |
| 2018/0266854 A1* | 9/2018 | Moore .............. | G01B 11/161 |
| 2019/0025095 A1* | 1/2019 | Steel ................ | G01B 11/16 |

* cited by examiner

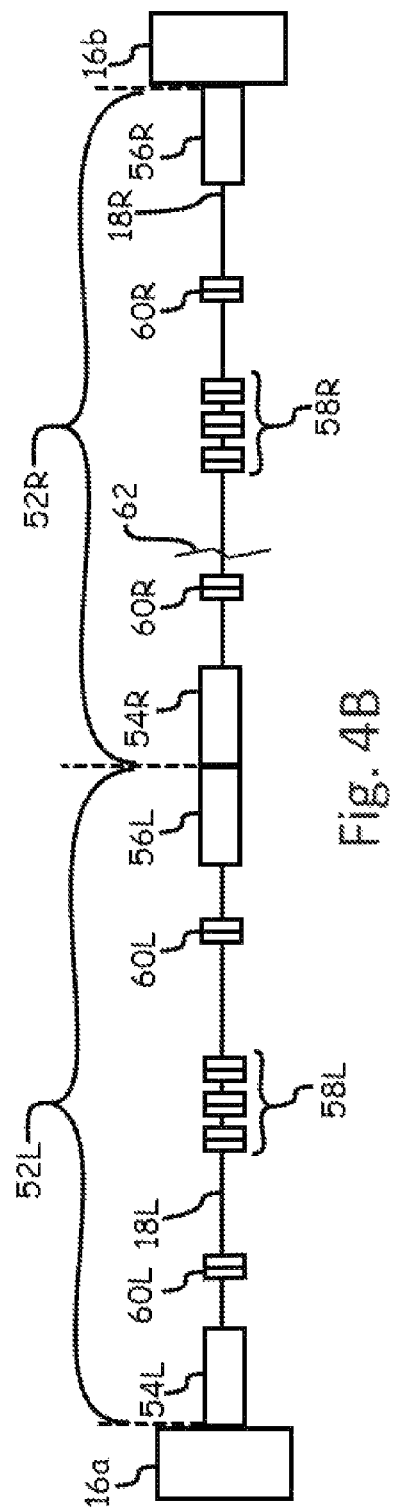

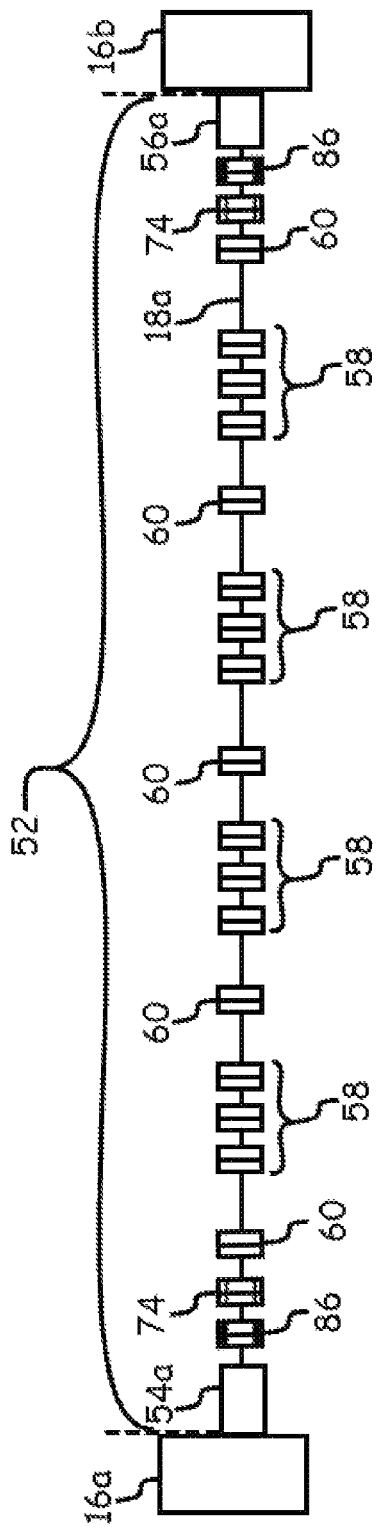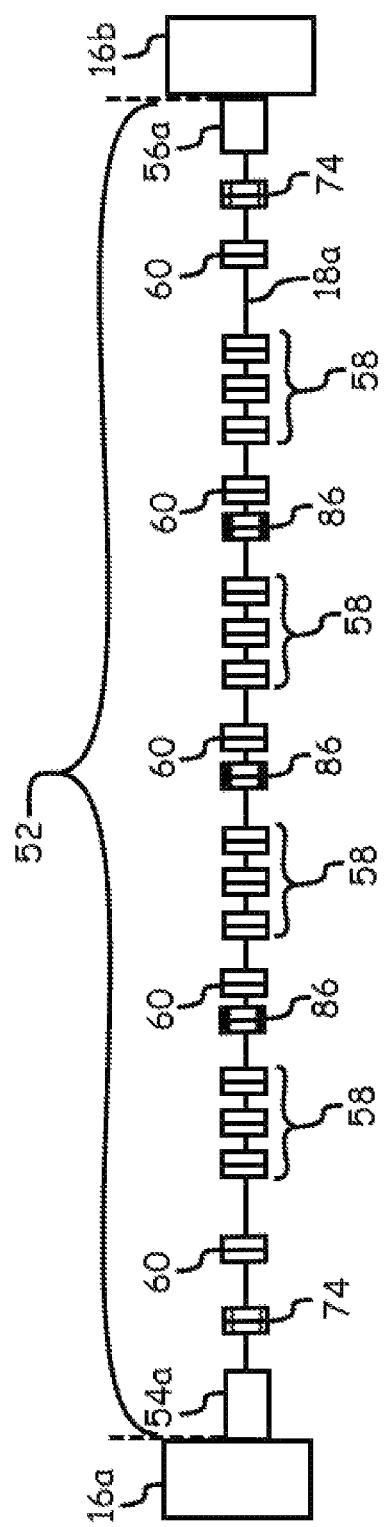

US 10,768,055 B2

DEVICE AND METHOD OF CALIBRATING FIBER BRAGG GRATING BASED FIBER OPTIC OVERHEAT SYSTEMS

BACKGROUND

This disclosure relates generally to aircraft system health monitoring for overheat and fire detection systems. More particularly, this disclosure relates to aircraft system health monitoring using optical signals.

Prior art overheat detection systems typically utilize eutectic salt technology to sense an overheat event. The eutectic salt surrounds a central conductor and the eutectic salt is surrounded by an outer sheath. A monitoring signal is transmitted along the central conductor, and under normal operating conditions the eutectic salt operates as an insulator such that no conduction occurs between the central conductor and the outer sheath. When an overheat event occurs, however, a portion of the eutectic salt melts and a low-impedance path is formed between the central conductor and the outer sheath. The low-impedance path is sensed by an electronic controller, which generates an overheat alarm signal. When the overheat event has subsided, the eutectic salt re-solidifies and once again insulates the central conductor. Through the use of various salts to create a eutectic mixture, a specific melting point for the salt can be achieved. Accordingly, different eutectic salts can be used in different areas of the aircraft to provide overheat monitoring across a variety of temperatures. While the eutectic salt technology enables detection of overheat events, the eutectic salt technology merely provides a binary indication of whether an overheat event has or has not occurred.

SUMMARY

A system configured to monitor a plurality of zones of an aircraft includes a line replaceable unit, a first interrogator, and a controller. The line replaceable unit includes first and second connectors in optical communication and an optical fiber extending between the first and second connectors. The first end of the optical fiber is connected to the first connector. The optical fibers includes a first plurality of fiber Bragg gratings disposed in the optical fiber and a plurality of calibration fiber Bragg gratings located in a pattern that provides information related to a calibration value of the line replaceable unit based upon a center wavelength of each of the first plurality of fiber Bragg gratings. The first interrogator is connected to the line replaceable unit at the first end of the optical fiber and is configured to provide a first optical signal to the optical fiber and to receive a first optical response signal from the optical fiber. The controller is operatively connected to the first interrogator and is configured to determine the calibration value of the line replaceable unit.

A method of calibrating a fiber optic overheat system includes emitting a first optical signal into the optical fiber with a first optical transmitter disposed in a first interrogator connected to an optical fiber. The optical fiber includes a plurality of overheat fiber Bragg gratings disposed in the optical fiber, and a plurality of calibration fiber Bragg gratings disposed in the optical fiber. The first optical signal is reflected with at least one of the plurality of calibration fiber Bragg gratings to create a response signal. The response signal from the optical fiber based upon the reflected first optical signal is received by a first optical receiver in the first interrogator. The received response signal is detected to identify presences of each of the plurality of calibration fiber Bragg gratings. A calibration value is determined based upon the identified presences of the plurality of calibration fiber Bragg gratings.

A detection system includes a line replaceable unit, a first interrogator, a second interrogator, and a controller. The line replaceable unit includes first and second connectors in optical communication, and an optical fiber extending between the first and second connectors. A first end of the optical fiber is connected to the first connector. The optical fiber includes a plurality of overheat fiber Bragg gratings, a first timing fiber Bragg grating, and a plurality of calibration fiber Bragg gratings. The first timing fiber Bragg grating is configured to indicate at least one of a start point and end point of the line replaceable unit. The plurality of calibration fiber Bragg gratings are located in a pattern that provides information related to a calibration value of the line replaceable unit based upon a center wavelength of each of the first plurality of overheat fiber Bragg gratings. The first interrogator is connected to the line replaceable unit at the first end of the optical fiber and is configured to provide a first optical signal to the optical fiber and to receive a first optical response signal from the optical fiber. The second interrogator is connected to the second end of the optical fiber and is configured to provide a second optical signal to the optical fiber and to receive a second optical response signal from the optical fiber. The controller is operatively connected to the first interrogator and is configured to determine the calibration value of the line replaceable unit.

BRIEF DESCRIPTION OF THE DRAWINGS

FIG. 4B is a simplified block diagram of a fiber optic event detection system with two line replaceable units including overheat fiber Bragg gratings and temperature fiber Bragg gratings.

FIG. 9A is a simplified block diagram of a fiber optic event detection system with a single line replaceable unit including overheat fiber Bragg gratings, temperature fiber Bragg gratings, timing marker fiber Bragg gratings, and calibration fiber Bragg gratings disposed in a first pattern.

FIG. 9B is a simplified block diagram of a fiber optic event detection system with a single line replaceable unit including overheat fiber Bragg gratings, temperature fiber Bragg gratings, timing marker fiber Bragg gratings, and calibration fiber Bragg gratings disposed in a second pattern.

DETAILED DESCRIPTION

Figure 1:
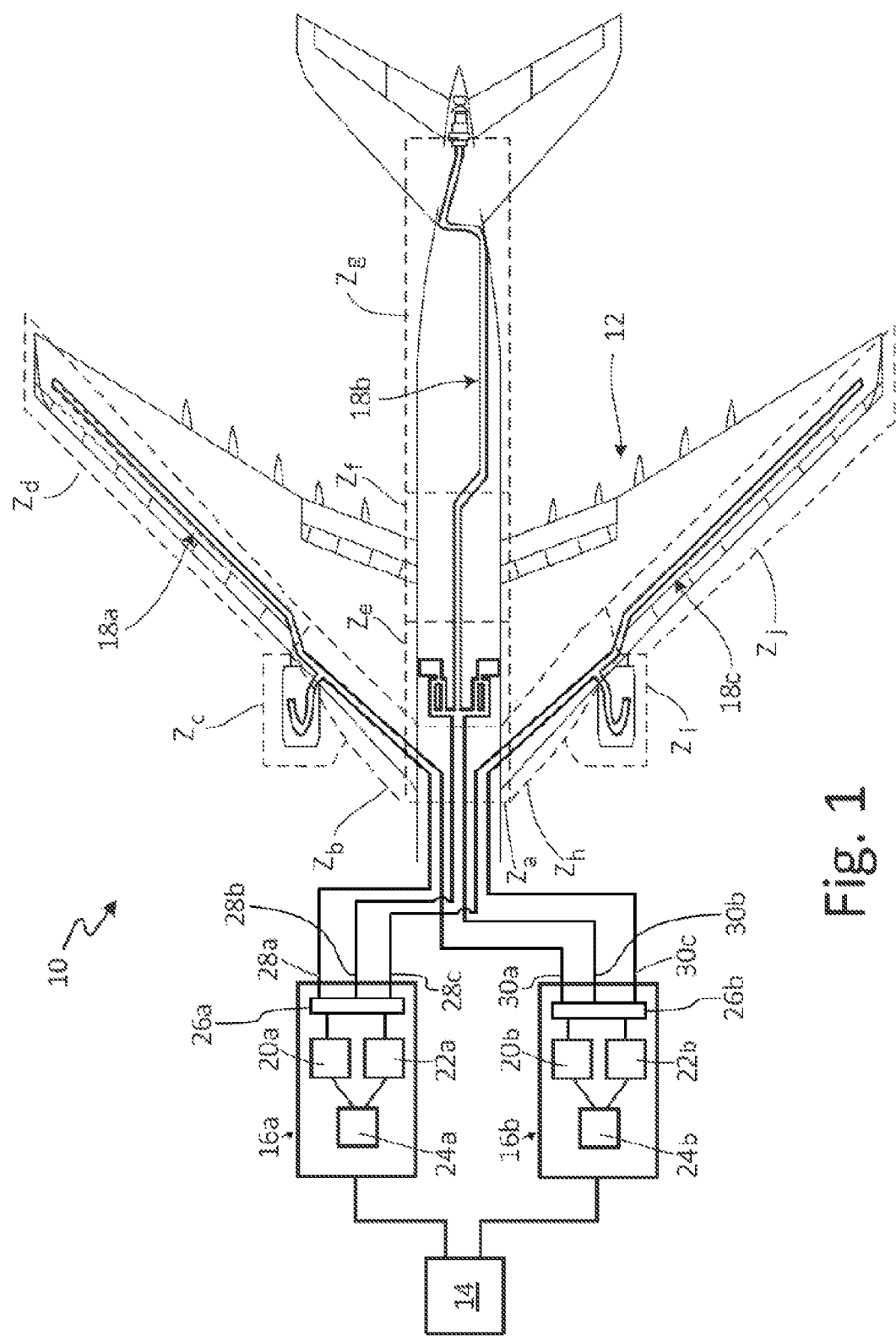
FIG. 1 is a schematic view of an overheat detection system architecture for monitoring multiple zones.

FIG. 1 is a schematic diagram of overheat detection system 10 for aircraft 12. Aircraft 12 includes zones Za-Zj and avionics controller 14. Overheat detection system 10 includes interrogators 16a-16b and optical fibers 18a-18c. Interrogator 16a includes optical transmitter 20a, detector 22a, and computer-readable memory 24a. Interrogator 16b includes optical transmitter 20b, detector 22b, and computer-readable memory 24b. Optical fibers 18a-18c include first ends 28a-28c and second ends 30a-30c.

Overheat detection system 10 is a system for detecting overheat events and/or specific temperature values throughout various areas of aircraft 12. Aircraft 12 is an airplane, helicopter, or other machine capable of flight. Zones Za-Zj may include any one or more locations on aircraft 12 where overheat detection is desired. For example, zones Za-Zj may include bleed air ducts, cross-over bleed air ducts, wheel wells, wing boxes, air conditioning (A/C) packs, anti-icing systems, nitrogen generation systems, or any other area where temperature sensing is desirable. While aircraft 12 is described as including ten zones, it should be understood that aircraft 12 may be divided into as many or as few zones as desired. Aircraft 12 may be divided into zones in any desired manner; for example, aircraft 12 may be divided into zones based on the overheat temperature for the components located in that zone or based on system type. Each zone Za-Zj of aircraft 12 may have a different alarm set point. For instance, when the temperature in zone Za is the same as the temperature in zone Zb, an overheat alarm may be triggered for zone Zb but not for zone Za.

Avionics controller 14 is a digital computer and can include one or more electronic control devices. In one non-limiting embodiment, avionics controller 14 can be a part of first or second interrogators 16a or 16b. In another non-limiting embodiment, avionics controller 14 can be omitted from overheat detection system 10 and such that first and or second interrogators 16a and 16b will determine all information, including zone configuration, the number of zones, temperature threshold, overheat detection, and other functionality of an avionics controller. In such a non-limiting embodiment, first and second interrogators 16a and 16b are connected with a communication channel so as to communicate with each other. Each of interrogators 16a and 16b may be a microprocessor, a microcontroller, application-specific integrated circuit (ASIC), a digital signal processor (DSP), a field programmable gate-array (FPGA), or other equivalent discrete or integrated logic circuitry. In this and other non-limiting embodiments discussed herein, interrogators 16a and 16b are fiber Bragg grating (FBG) interrogators (see e.g., FIGS. 2-9B). Interrogators 16a and 16b are substantially similar, and for ease of discussion, interrogator 16a with optical transmitter 20a, detector 22a, and computer-readable memory 24a will be discussed in further detail.

Optical fibers 18a, 18b, and 18c are fiber optic cables configured to communicate an optical signal. Optical fibers 18a, 18b, and 18c are substantially similar, and for ease of discussion, optical fibers 18a with first end 28a and second end 30a will be discussed in further detail. Optical fiber 18a is illustrated as including first end 28a and second end 30a. It should be understood that while optical fiber 18a is illustrated as including a single fiber optic cable, each of optical fibers 18a-18c can include one or more fiber optic cables. In other non-limiting embodiments, optical fibers 18a-18c can include one or more line replaceable units (LRUs) that divide optical fibers 18a-18c into separate, but connectable optical fiber segments. Throughout this disclosure, the term channel is synonymous with the optical fiber, and as such the two terms can be used interchangeably to refer to the same respective element.

Optical transmitter 20a may be any suitable optical source for providing an optical signal. In one non-limiting embodiment, optical transmitter 20a may be a light-emitting diode or a laser. It should be further understood that optical transmitter 20a may be configured to provide the optical signal in any suitable manner, such as through a single pulse at a fixed wavelength, a tunable swept-wavelength, a broadband signal, and/or a tunable pulse. Detector 22a is a receiver configured to receive an optical signal. For example, detector 22a may be a photodiode, a photodiode array, a phototransistor, a circulator, or any other suitable optical receiving device. While interrogator 16a is described as including a single detector 22a, it should be understood that interrogator 16a may include multiple optical receivers to receive the optical signal from different optical fibers, different fiber optic cables, and/or different ends of the fiber optic cables.

Computer-readable memory 24a can be configured to store electronic information during and after operation of aircraft 12. In one non-limiting embodiment, computer-readable memory 24a can be described as a computer-readable storage medium. In one non-limiting embodiment, a computer-readable storage medium can include a non-transitory medium. The term "non-transitory" can indicate that the storage medium is not embodied in a carrier wave or a propagated signal. In one non-limiting embodiment, a non-transitory storage medium can store data that can, over time, change (e.g., in RAM or cache). In one non-limiting embodiment, computer-readable memory 24a can include temporary memory, meaning that a primary purpose of the computer-readable memory is not long-term storage. In one non-limiting embodiment, computer-readable memory 24a can be described as a volatile memory, meaning that the computer-readable memory 24a does not maintain stored contents when electrical power is removed. In one non-limiting embodiment, examples of volatile memories can include random access memories (RAM), dynamic random access memories (DRAM), static random access memories (SRAM), and other forms of volatile memories. Couplers 26a and 26b are optical devices with one or more optical inputs and one or more optical outputs, and which are capable of splitting an optical signal into multiple channels. First end 28a and second end 30a are opposite ends of optical fiber 18a.

Overheat detection system 10 is disposed within and throughout various zones Za-Zj of aircraft 12. In this non-limiting embodiment, optical fiber 18a passes through zones Zb-Zd, optical fiber 18ab passes through zones Za and Ze-Zg, and optical fiber 18ac passes through zones Zh-Zj. As such, each optical fiber 18a-18c passes through and gathers information regarding multiple zones of aircraft 12. Avionics controller 14 is mounted within aircraft 12 and is electrically connected to interrogators 16a and 16b. Interrogator 16a is connected to avionics controller 14 to communicate information to avionics controller 14. Interrogator 16a is connected to optical transmitter 20a to control the transmission of an optical signal from optical transmitter 20a to fiber optic cable 18a. Interrogator 16a is also connected to detector 22a to analyze the signals received by detector 22a.

Optical fibers 18a-18c are substantially similar, and for purposes of clarity and ease of discussion, optical fiber 18a will be discussed in further detail. Optical fiber 18a passes through each of zones Zb-Zd and is connected to interrogator 16a and interrogator 16b. Optical fiber 18a is in optical communication with detector 22a of interrogator 16a and with detector 22b of interrogator 16b. Optical fiber 18a is connected to interrogator 16a on first end 28a and to interrogator 16b on second end 30a. Optical fiber 18b is connected to interrogator 16a on first end 28b and to interrogator 16b on second end 30b. Optical fiber 18c is connected to interrogator 16a on first end 28c and to interrogator 16b on second end 30c. Interrogators 16a and 16b are connected to avionics controller 14 to communicate with other systems within aircraft 12.

Optical transmitter 20a is mounted within interrogator 16a and is in optical communication with optical fiber 18a via coupler 26a. Detector 22a is mounted within interrogator 16a and is in optical communication with optical fiber 18a via coupler 26a. Computer-readable memory 24a is mounted within interrogator 16a and is communication with optical transmitter 20a and detector 22a. Coupler 26a is mounted within interrogator 16a and is in optical communication with optical transmitter 20a, detector 22a, and optical fiber 18a. First end 28a of optical fiber 18a is connected to interrogator 16a and is in optical communication with coupler 26a and with second end 30a of optical fiber 18a. Second end 30a of optical fiber 18a is connected to interrogator 16b and is in optical communication with coupler 26b and with first end 28a of optical fiber 18a.

Overheat detection system 10 can sense a temperature or strain at any location or at multiple locations along optical fiber 18a. Because the temperature can be sensed at any location or multiple locations along optical fiber 18a, a temperature profile may be developed for the entire lengths of optical fiber 18a, 18b, and 18c, and as such, a temperature profile may be developed for each zone Za-Zj. Overheat detection system 10 can further provide locational information regarding a determined location within each zone Za-Zj at which an event occurs. The temperature profile for each zone Za-Zj can then be compared to a maximum allowable temperature profile, which can include a single temperature for an entire zone Za-Zj or multiple temperatures at varying locations in each zone Za-Zj. It should be understood that communications for overheat detection system 10 can be made using any combination of wired, wireless, or optical communications.

Aircraft 12 may include a central overheat detection system computer that communicates with various overheat detection systems on aircraft 12, and the central overheat detection system computer may communicate any overheat status from any overheat detection system to the cockpit. Avionics controller 14 communicates information from interrogators 16a and 16b to other systems within aircraft 12.

Interrogators 16a-16b can communicate with avionics controller 14, and avionics controller 14 can consolidate the information received from interrogators 16a-16b and provide the information to the cockpit, provide the information to maintenance personnel, and/or store the information to generate trend data. While interrogators 16a-16b are described as communicating with avionics controller 14, it should be understood that interrogators 16a-16b can communicate directly with the cockpit or ground personnel, can store the information to generate trend data, and/or can communicate with a central overheat computer. It should be understood that all communications for overheat detection system 10 can be made using wired, wireless, or optical communications or some combination of these methods.

While interrogator 16a is described as communicating with avionics controller 14, interrogator 16a may communicate with aircraft 12 and with maintenance personnel in any suitable manner. Interrogator 16a may also communicate directly with a cockpit of aircraft 12 to provide overheat or fire detection warning, or to indicate that maintenance is necessary. Interrogator 16a may further communicate temperature data to other system computers, which may communicate an overheat status to the cockpit. Interrogator 16a may further communicate with avionics controller 14 to communicate temperature data to avionics controller 14 using a wired or wireless connection.

Interrogator 16a may be configured to control optical transmitter 20a to control the transmission of an optical signal through optical fiber 18a. Interrogator 16a may also be configured to receive an optical signal from detector 22a and to analyze the optical signal received at detector 22a. Interrogator 16a receives information regarding the optical signal from detector 22a. Variations in the optical signals analyzed by interrogator 16a allow interrogator 16a to determine the temperature within zones Za-Zj and to determine a location of temperature variation within zones Za-Zj. The variations in the optical signals also allow interrogator 16a to determine the strain experienced at various locations along optical fiber 18a. Interrogator 16a is configured to determine the occurrence of an overheat event, the zone in which the overheat event has occurred in, and whether the overheat event is at or above the alarm set point for that zone. Interrogator 16a therefore identifies the length and alarm set point of optical fiber 18a in each zone Za-Zj and the order in which optical fiber 18a passes through each zone Za-Zj.

Interrogator 16a can also generate trend data to facilitate health monitoring of aircraft 12. The trend data may include data regarding temperature trends, strain trends, or both. The trend data can be stored in memory 24a of interrogator 16a or in any other suitable storage medium at any other suitable location, such as the memory of avionics controller 14. It should be understood that the data can be monitored in real time. In one non-limiting embodiment, interrogator 16a may communicate with a dedicated health monitoring system to monitor the temperature data in real time. The stored trend data provides statistical and historical data for the temperature, strain (or both) experienced in all zones Za-Zj. The temperature trend data may be stored and monitored by maintenance personnel. As such, the temperature trend data allows maintenance personnel to determine the location of progressive temperature increases over time.

It should be further understood that interrogator 16a can generate the location of a one-time temperature variation, strain variation, or both. Generating the locations of progressive temperature increases allows for preventative, targeted maintenance before a failure occurs. For example, the temperature trend in a right wheel well may be monitored to generate trend data. The trend data may show that a tire within the right wheel well exceeds the normal operating temperatures without reaching the alarm set point. In such a case, an overheat event does not occur; however, the temperature trend data informs maintenance personal that the tire may be close to failing or that the tire may be low on air pressure and that a maintenance action is required. Similar to temperature monitoring, the strain trend data may be stored and areas of increased strain may be located. In one non-limiting embodiment, the pressure of the bleed air passing through a bleed duct may impart a strain on the wall of the bleed duct. The level of the strain and the location of the strain may be detected by interrogator 16a analyzing the information received from the optical signals. The strain information may then be communicated to ground personnel and used to investigate the location of the increased strain to determine any maintenance action that should be taken.

Optical fibers 18a, 18b, and 18c are configured to transmit and/or communicate an optical signal. As will be discussed with reference to other figures, FBG sensors disposed along optical fibers 18a, 18b, and 18c are used to determine linear expansion of optical fibers 18a, 18b, and 18c throughout operation of aircraft 12. As such, optical fibers 18a, 18b, and 18c can provide temperature and/or strain sensing across all zones Za-Zj. Optical transmitter 20a provides an optical signal to optical fibers 18a, 18b, and 18c. Optical transmitter 20a is configured to provide an optical signal to first end 28a of optical fiber 18a. It should be understood that a single optical transmitter 20a may provide the same optical signal to each of optical fibers 18a, 18b, and 18c.

Detector 22a is configured to receive either optical reflection signals excited by optical transmitter 20a or optical transmission signals excited by optical transmitter 20b. Where optical transmitter 20a provides the optical signal through first end 28a, the optical signal travels through optical fiber 18a and is reflected back to first end 28a and received by detector 22a. Detector 22a communicates information regarding the first portion of the optical signal, the second portion of the optical signal, or both to interrogator 16a. In some non-limiting examples, computer-readable memory 24a can be used to store program instructions for execution by one or more processors of interrogator 16. For instance, computer-readable memory 24a can be used by software or applications executed to temporarily store information during program execution.

Coupler 26a splits an optical signal received from optical transmitter 20a into optical signals for each of optical fibers 18a, 18b, and 18c. In this non-limiting embodiment, coupler 26a includes a 2×3 configuration (e.g., 2 inputs and 3 outputs). In other non-limiting embodiments, coupler 26a can include one or more couplers including N×M configurations, wherein N and M can be any number of inputs and outputs. First end 28a is configured to communicate an optical signal from interrogator 16a to optical fiber 18a and to communicate an optical signal from optical fiber 18a to interrogator 16a. Second end 30a is configured to communicate an optical signal from optical fiber 18a to interrogator 16b and to communicate an optical signal from interrogator 16b to optical fiber 18a.

Different systems within aircraft 12 require overheat detection monitoring, and each system may be divided into multiple zones. For example, a bleed air duct in aircraft 12 may include multiple zones with a single optical fiber extending through all of the zones of the bleed air duct. Each system may thus be divided into multiple zones and may include a dedicated interrogator and optical fiber. It should be understood, however, that aircraft 12 may be divided into zones in any desired manner.

First end 28a of optical fiber 18a receives an optical signal from optical transmitter 20a located within interrogator 16a, optical fiber 18a transmits the optical signal through optical fiber 18a to second end 30a, and second end 30a transmits the optical signal to detector 22b located within interrogator 16b. Interrogator 16b analyzes the signal received by detector 22a to determine the temperature in zones Zb-Zd. Each zone Zb-Zd may have a different alarm set point as the temperature resistance of each zone may differ. As such, interrogator 16b analyzes the information received to determine the temperature in each zone. In addition to determining temperature in zones Zb-Zd, interrogator 16b can analyze the information received from optical fiber 18a to determine the strain experienced in each zone Zb-Zd. Interrogator 16b can thus monitor temperature, strain, or both within zones Zb-Zd. While optical fiber 18a is described as being connected to interrogators 16a and 16b, it should be understood that optical fiber 18a can be disposed in a single-ended configuration such that only one of first end 28a and second end 30a is connected to interrogator 16a. For example, in the single-ended configuration where first end 28a is connected to interrogator 16a, interrogator 16a can provide an optical signal to first end 28a of optical fiber 18a and can interpret the signal that is reflected back through first end 28a.

Figure 2:
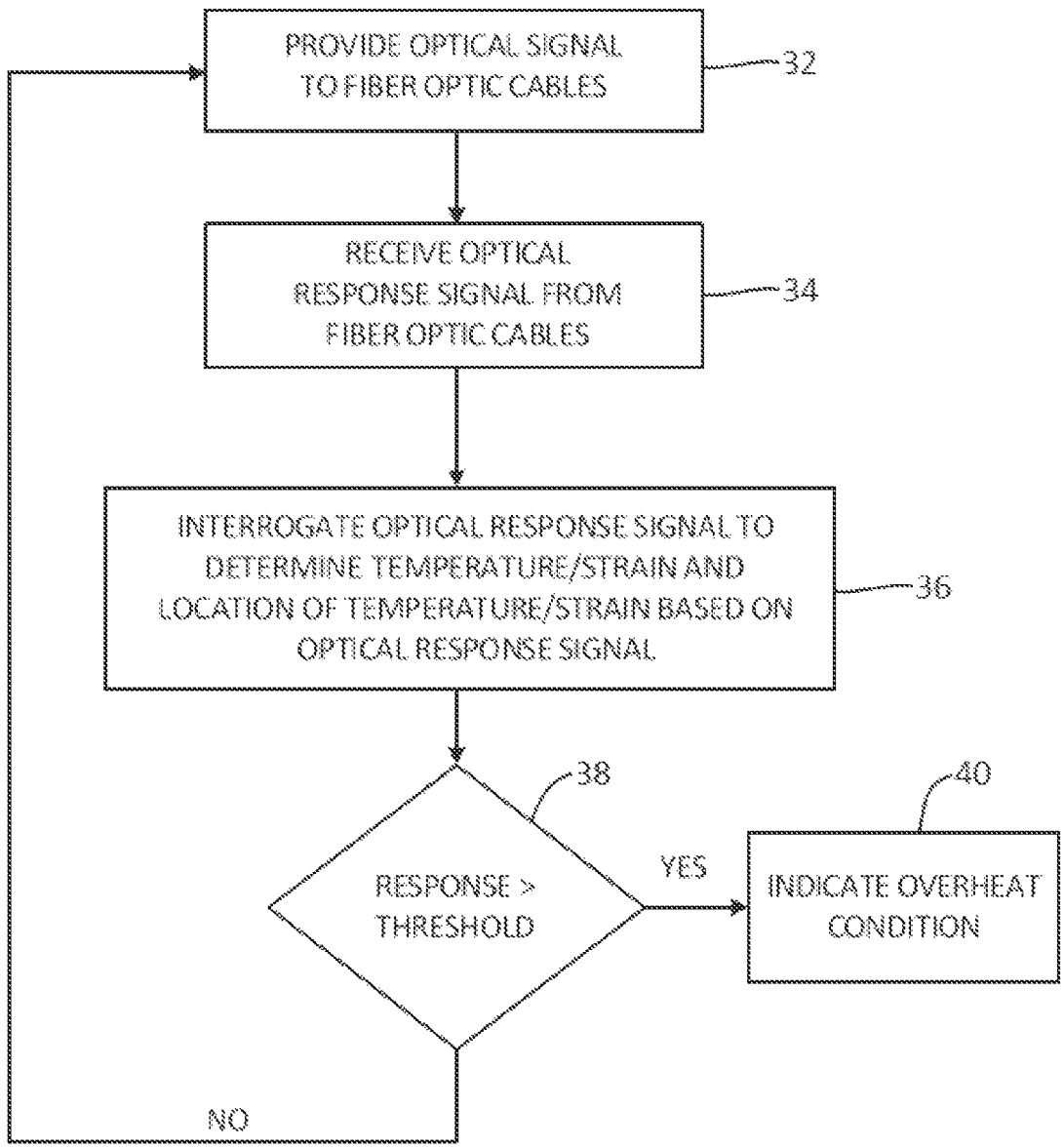
FIG. 2 is a flow diagram illustrating example operations to provide overheat detection in an aircraft utilizing optical signals.
Figure 3:
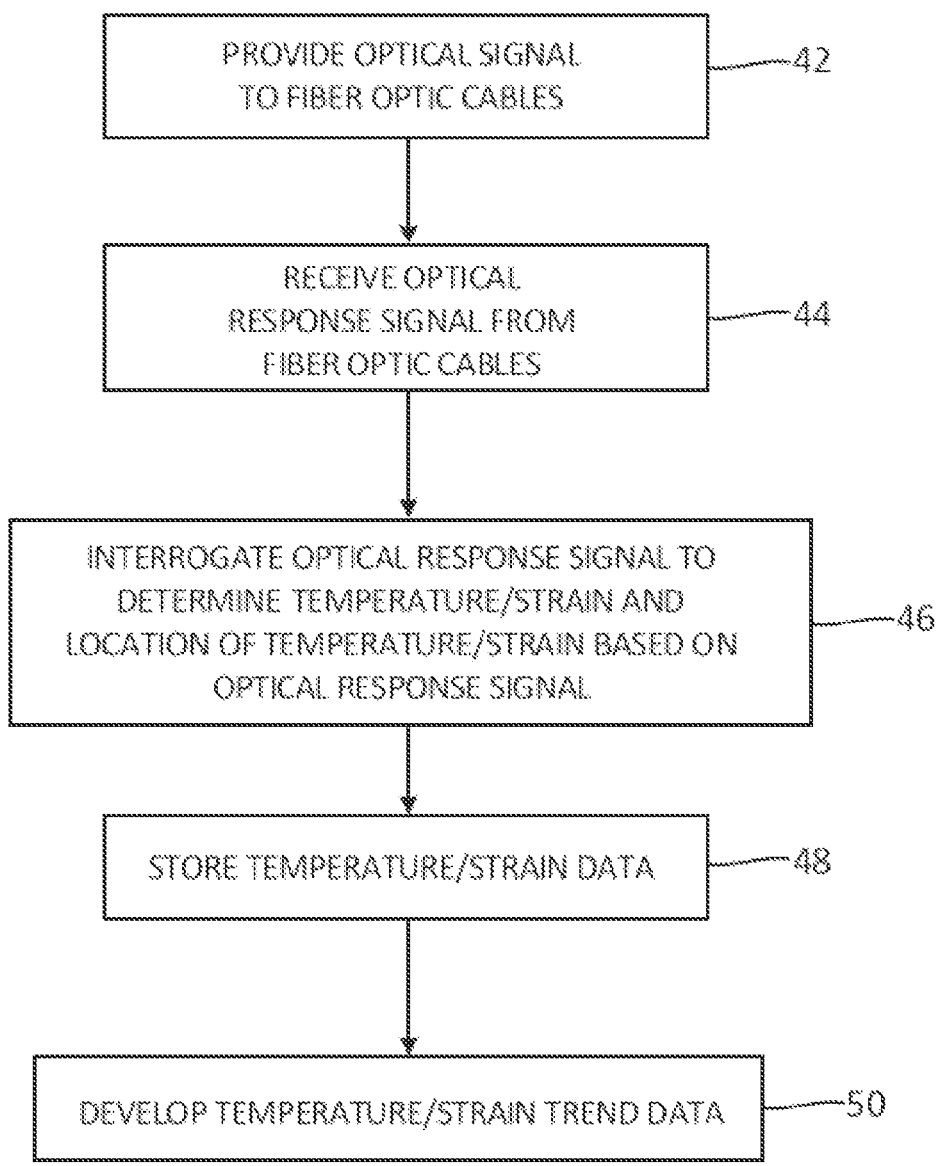
FIG. 3 is a flow diagram illustrating example operations using optical signals to provide health monitoring for an aircraft.

Additional examples of fiber optic overheat detection systems can be found in co-pending U.S. patent application Ser. No. 15/600,100 filed on May 19, 2017, which is herein incorporated by reference in its entirety. With continued reference to FIG. 1, FIGS. 2-3 are flow diagrams illustrating example operations for determining the occurrence and location of an overheat event. For purposes of clarity and ease of discussion, the example operations are described below within the context of overheat detection system 10. The non-limiting embodiments discussed herein can be for any FBG sensing system regardless of what is being measured (i.e., temperature, or otherwise).

FIG. 2 is a flow diagram illustrating example operations to provide overheat detection in an aircraft utilizing optical signals. In step 32, an optical signal is provided to one or more fiber optic cables, such as optical fibers 18a-18c. For example, optical transmitter 20a can provide an optical signal to optical fiber 18a through first end 28. In step 34, an optical response signal is received by detector 22a from optical fiber 18a. For instance, detector 22a may receive the optical response signal from optical fiber 18a, and detector 22a may provide the optical response signal to interrogator 16a. In step 36, the optical response signal is analyzed to determine the temperature, strain, or both along optical fiber 18a. For example, interrogator 16a may analyze the optical response signal received from detector 22a to determine the actual temperature and/or strain at various locations along optical fiber 18a. Interrogator 16a may use any suitable method to analyze the optical response, such as the methods discussed below. It should be understood that optical fiber 18a may sense a temperature at any location along optical fiber 18a and the optical signal can be interrogated to determine the precise location at which the temperature change occurs. As such, the temperature data analyzed by interrogator 16a may include information to determine a temperature at a single location within a zone, a temperature at multiple locations throughout a zone, a temperature profile for a zone, or any other temperature information for the zone. In step 38, the temperature data and/or strain data generated in step 36 is compared against a threshold. Where the temperature data and/or strain data indicates that the temperature and/or strain are below the threshold level, the operation returns to step 32. Where the temperature data and/or strain data indicates that the temperature and/or strain are above the threshold level, the operation proceeds to step 40 and the existence of the overheat condition is indicated and communicated to the cockpit and/or ground personnel.

FIG. 3 is a flow diagram illustrating example operations using optical signals to provide health monitoring for an aircraft. In step 42, an optical signal is provided to one or more fiber optic cables, such as optical fibers 18a-18c. In step 44, an optical response signal is received from optical fiber 18a. In step 46, the optical response signal is analyzed to determine the temperature, strain, or both experienced along optical fiber 18a. In step 48, the temperature data, strain data, or both is stored in a memory. For example, temperature data may be stored in memory 24a of interrogator 16a. In step 50, trends are developed for the stored temperature data and/or strain data, and the trends are monitored for any patterns indicating that a maintenance action is necessary.

By utilizing optical fiber 18a to determine the existence of an overheat event, prior art eutectic salt sensors, and therefore the electrical connections associated with the eutectic salt sensors, may be eliminated from aircraft 12. The prior art eutectic salt sensors sense whether an overheat event is or is not occurring, and as such provide a binary response. Unlike the prior art eutectic sensors, optical fiber 18a senses any changes in temperature and the location of the temperature change, not merely whether a temperature set point has been exceeded. As such, interrogator 16a may gather trend data for each zone that optical fiber 18a extends through, as data is continuously gathered by interrogator 16a. Temperature trend data provides information to maintenance personnel regarding the overall health of each zone Za-Zj. Providing the trend data allows for maintenance to be performed at specific, relevant locations and only when needed, thereby decreasing the downtime of aircraft 12. In addition to providing temperature trend data, optical fiber 18a is able to sense strain within each zone Za-Zj, unlike the prior art eutectic salt sensors that are sensitive to temperature alone. Utilizing optical fiber 18a thus provides additional structural information to maintenance personnel.

Monitoring the temperature trend, strain trend, or both within zones Za-Zj provides information regarding the overall health of the zone being monitored, and of the system within which the zone is located. The trend data can be used to facilitate preventative maintenance. Moreover, monitoring the trend data allows for maintenance actions to be scheduled at a convenient time and location, instead of waiting until an actual failure occurs, which can lead to gate departure delay, cancelled flights, or in-flight crew action. In addition, monitoring the actual temperature in zones Za-Zj enables overheat detection system 10 to provide fire monitoring in addition to overheat detection. A sudden, dramatic increase in temperature can indicate the existence of a fire instead of an overheat event. For example, a fire in a wheel well would cause a sudden, dramatic increase in temperature in the wheel well, and that sudden, dramatic increase would be sensed by the portion of the fiber optic cable passing through the zone that includes the wheel well. Interrogator 16a can analyze the data provided from the zone that includes the wheel well to determine the existence of the fire event, and to communicate the existence of the fire event to the cockpit, to a fire suppression system, or to any other appropriate system or personnel.

A variety of fiber optic cables and operating principles may be used to determine the existence of an overheat event. For example, overheat detection system 10 may utilize a single fiber optic cable, dual fiber optic cables, and fiber optic cables including FBGs. Moreover, the fiber optic cables may be arranged in a single loop configuration, a dual loop configuration, or any other suitable configuration. An optical signal is initially provided to optical fiber 18a, and as the optical signal travels through optical fiber 18a the majority of the optical signal travels from first end 28a to second end 30a, but a fraction of the optical signal is backscattered towards first end 28a. Interrogators 16a and 16b can analyze the portion of the optical signal received through second end 30, the portion of the optical signal backscattered through first end 28a, or a combination of both to determine temperature and/or strain information. As such, it should be further understood that optical fiber 18a can be arranged in a single-ended configuration where one of first end 28a or second end 30a is connected to one of interrogator 16a or interrogator 16b. In a single-ended configuration, interrogator 16a can provide the optical signal through one end of optical fiber 18a and can interpret the portion of the optical signal backscattered through the end of optical fiber 18a connected to interrogator 16b.

Where optical fiber 18a includes FBGs, interrogator 16a can analyze the optical signal using a variety of principles, including Wave Division Multiplexing (WDM), Time Division Multiplexing (TDM), and/or a combination of WDM and TDM (WDM/TDM), among others. A FBG is a distributed reflector within the fiber optic cable that is configured to reflect a particular wavelength of light and allow all other wavelengths to pass through. As such, the FBGs function as wavelength-specific reflectors. The specific wavelength reflected by a specific FBG is the Bragg wavelength. In overheat detection system 10, optical fiber 18a includes various FBGs within optical fiber 18a. Different FBGs may be disposed within different zones in the aircraft. As such, the Bragg wavelength associated with each zone differs from the Bragg wavelength associated with the other zones. Because interrogator 16a can identify which Bragg wavelength is associated with which zone, interrogator 16a may determine the distance to each FBG based on the time taken for the Bragg wavelength to travel from first end 28a, to the FBG, and back to first end 28a. The Bragg wavelength is sensitive to both strain and temperature. Changes in strain and temperature result in a shift in the Bragg wavelength, which can be detected by interrogator 16a and used to determine the change in strain and/or temperature.

In WDM, interrogator 16a provides an optical signal to first end 28a of optical fiber 18a with optical transmitter 20a. Optical transmitter 20a can be a tunable, swept-wavelength laser. The wavelength of optical transmitter 20a is swept across a pre-defined range. The wavelength of the optical signal being transmitted at any given moment in time is known. The Bragg wavelengths are received at first end 28a of optical fiber 18a by detector 22a, and interrogator 16a correlates or maps changes in the Bragg wavelengths into intensity as a function of time. A shift in the Bragg wavelength indicates a change in temperature and/or strain, and tracking the changes in the Bragg wavelength enables interrogator 16a to determine the temperature at each FBG within each zone $Z_1$-$Z_n$.

In TDM, optical transmitter 20a is a broadband laser light source such that multiple wavelengths are transmitted through optical fiber 18a. Each FBG is configured to reflect a particular Bragg wavelength. Interrogator 16a monitors the time required for the each Bragg wavelength to return to first end 28a. The time required for each Bragg wavelength to return to first end 28a indicates the location of each FBG in optical fiber 18a. Having established the location of each FBG in optical fiber 18a, optical transmitter 20a provides pulses through optical fiber 18a. The wavelength of each pulse can be determined when the reflected pulse arrives at interrogator 16a. Changes in the wavelength are detected and converted to intensity verses time, thereby allowing interrogator 16a to determine the temperature at the location of each FBG in optical fiber 18a.

In WDM/TDM, interrogator 16a provides optical signals through optical fiber 18a utilizing both a tunable, swept-wavelength laser and a broadband laser light source. Similar to both WDM and TDM, in WDM/TDM the reflected Bragg wavelengths are monitored for any changes in the wavelengths. The changes in the wavelengths are converted to intensity verses time, thereby allowing interrogator 16a to determine the temperature at the location of each FBG. WDM/TDM reduces the loss of any signal in the FBG and the total wavelength that must be scanned to interrogate the Bragg wavelength is similarly reduced. Temperature changes cause the Bragg wavelength to shift, and the shift in the Bragg wavelength is analyzed by interrogator 16a to determine the temperature shift, and thereby whether an overheat event has occurred. In addition, the location of the overheat event is detected by interrogator 16a based on the shift in a particular Bragg wavelength, as the location of a FBG associated with a Bragg wavelength is known.

In some non-limiting embodiments, interrogator 16a can analyze the optical signal using any suitable method, including Optical Time Domain Reflectometry (OTDR), COFDR, Brillouin Optical Frequency Domain Analysis (BOFDA), Brillouin Optical Time Domain Analysis (BOTDA), Incoherent Optical Frequency Domain Reflectometry (IOFDR) utilizing a Swept Frequency Methodology, and IOFDR utilizing a Step Frequency Methodology. Examples of such methods can be found in co-pending U.S. patent application Ser. No. 15/600,100 filed on May 19, 2017, which is herein incorporated by reference in its entirety.

Existing overheat detection sensors and systems are based on a technology using eutectic salts as a temperature switch to indicate when a leak occurs in the system, e.g., a bleed air system. The eutectic salt sensor technology however, is reaching the limitations of its capability with respect to manufacturability, precision of overheat detection, overheat location, and fault location. Additionally, rapid changes have been seen in the overheat detection system industry requirements, e.g., aircraft industry, which, because of the reduced tolerance of composites to increased ambient temperature, require rapid detection of relatively small overheat events. The net result is a need to look for an alternate technical solution to address this need.

A candidate for the next generation overheat detection system is based on the above mentioned distributed temperature sensing using FBGs. A FBG is an optical sensor consisting of periodic index of refraction changes within the core of a single-mode optical fiber. The FBG acts as a wavelength selective mirror, reflecting only in a narrow wavelength band, which varies with strain and/or temperature experienced by the optical fiber. Measurements are then made by determining the amount of shift of the center wavelength of the reflected signal.

As discussed above, an interrogator connected to the optical fiber with FBGs will use either a scanned wavelength laser or a broadband source with a spectrum analyzer to generate a signal representing a returned spectrum from the sensing array of FBGs. For a single FBG, the return spectrum is a narrow Gaussian shaped return, the center wavelength of which is dependent on temperature and strain of the location on optical fiber where the single FBG is located. A significant advantage of a system involving FBGs is that there are two options for multiplexing large sensor arrays into a single interrogator: wavelength division multiplexing (WDM); and time division multiplexing (TDM).

For a WDM system, the FBGs can be fabricated in well-defined wavelength zones, where each zone is independent. The return spectrum for a WDM type system has characteristic Gaussian returns spaced across the spectrum, each return representing a unique FBG. A limit or constraint of such a system is the amount of spectrum that can be interrogated and the amount of spectral movement expected during the measurement for each FBG. N some non-limiting embodiments, systems can scan a laser over 40 nm with 16 defined zones, each of which can monitor a sensor over a 200° C. temperature range. The relative movement of the wavelength center for an FBG with respect to temperature is typically around 10 pm/° C.

For a TDM system, the signal source is pulsed with very short pulses. The concept is to differentiate unique FBGs in a single optical fiber by the time it takes the reflected optical signal to return from each FBG. Representative time values are about 1 nanoseconds for 10 centimeters of optical fiber length. So, to measure FBG sensors spaced 0.5 meters apart on an optical fiber, the optical signal pulse should not be greater than 5 nanoseconds in width. To ensure the reflected optical return signal represents only one FBG sensor at a given time, a pulse around half the width of 5 nanoseconds would be beneficial, such as for example, a relationship of 0.5 nanoseconds per 10 centimeters of fiber length. For an overheat application, dual-sided interrogation can be used to monitor up to multiple independent channels, each with a number of zones separated in wavelength and including a specific wavelength zone that will use TDM to provide quasi-distributed temperature measurements. Representation of this concept is depicted in FIGS. 4A and 4B.

Method to Isolate Individual Channels in a Multi-Channel Fiber Optic Event Detection System (FIGS. 4A-6)

The next portions of the disclosure refer to and discuss a method to isolate individual channels in a multi-channel fiber optic event detection system.

Figure 4A:
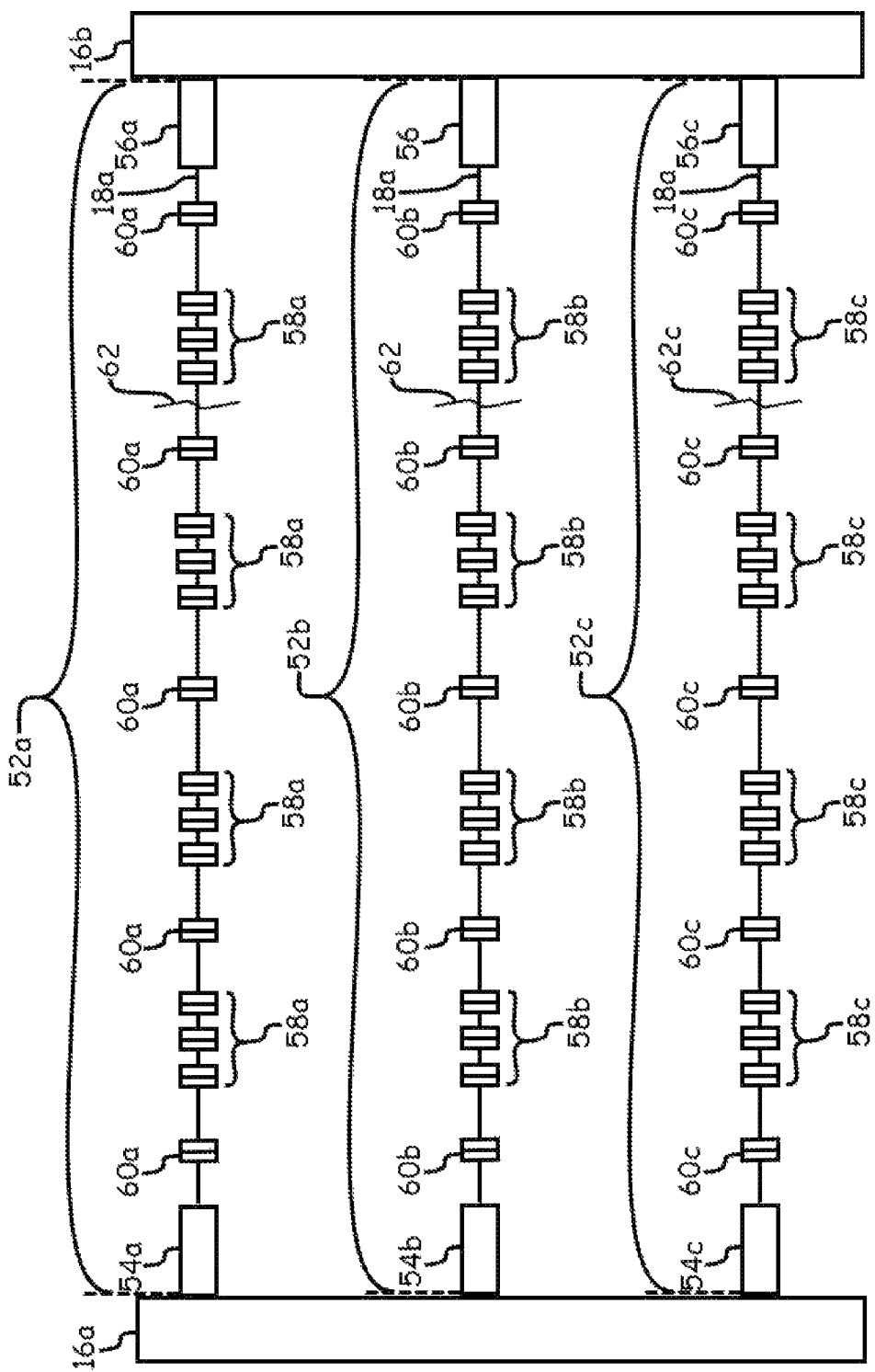
FIG. 4A is a simplified block diagram of a fiber optic event detection system with a single line replaceable unit including overheat fiber Bragg gratings and temperature fiber Bragg gratings.

FIG. 4A is a simplified block diagram of first LRU 52a (line replaceable unit), second LRU 52b, and third LRU 52c and shows first interrogator 16a, second interrogator 16b, and first, second, and third LRUs 52a, 52b, and 52c respectively including: optical fibers $18a_1$, $18a_2$, and $18a_3$; first connectors 54a, 54b, and 54c; second connectors 56a, 56b, and 56c; overheat FBG sensors 58a, 58b, and 58c; temperature FBG sensors 60a, 60b, and 60c; and breaks 62a, 62b, and 62c in optical fibers 18a, 18b, and 18c). First, second, and third LRUs 52a, 52b, and 52c and the components thereof are substantially similar, and for purposes of clarity and ease of discussion, first LRU 52a will be discussed in further detail. In the non-limiting embodiment shown in FIG. 4A, breaks 62a, 62b, and 62c are shown as being present in first LRU 52a, second LRU 52b, and third LRU 52c. However, breaks 62a, 62b, and 62c are typically not included in first LRU 52a, second LRU 52b, and third LRU 52c, but rather it should be understood that breaks 62a, 62b, and 62c represent potential physical conditions of first LRU 52a, second LRU 52b, and third LRU 52c that can form and/or be present.

First LRU 52a is a discrete line replaceable unit that is part of overheat detection system 10 (shown in FIG. 1). First LRU 52a includes first connector 54a, second connector 56a, and optical fiber $18a_1$. First connector 54a and second connector 56a are linking devices. Overheat FBG sensors 58a are fiber Bragg grating ("FBG") optical sensors configured to sense an overheat condition of optical fiber $18a_1$. In this non-limiting embodiment, three overheat FBG sensors 58a are shown to be positioned between consecutive temperature FBG sensors 60a. In other embodiments, there can be more or less than three consecutive overheat FBG sensors 58a positioned between consecutive temperature FBG sensors 60a, such as for example twenty overheat FBG sensors 58a.

Temperature FBG sensors 60a are FBG optical sensors configured to sense a temperature of optical fiber $18a_1$. In other non-limiting embodiments, quantities of overheat FBG sensors 58a and temperature FBG sensors 60a included in first LRU 52a can be more or less than the quantities shown in FIGS. 4A and 4B. In this non-limiting embodiment, approximately uniform distances are shown between adjacent same-type FBGs along optical fiber $18a_1$, however, non-uniform distances can also be incorporated. Break 62a is a breakage or damaged portion in optical fiber $18a_1$. In this non-limiting embodiment, break 62a represents a potential physical state of a portion of optical fiber $18a_1$. For example, the typical operating state of optical fiber $18a_1$ does not include break 62a (and likewise for optical fibers $18a_2$ and $18a_3$).

First LRU 52a is attached and connected to first and second interrogators 16a and 16b via first and second connectors 54a and 56a. First connector 54a is mounted onto an end of optical fiber $18a_1$ and is connected to first interrogator 16a. Second connector 56a is mounted onto the opposite end of optical fiber $18a_1$ from first connector 54a and is connected to second interrogator 16b. Overheat FBG sensors 58a and temperature FBG sensors 60a are disposed in and along portions of optical fiber $18a_1$. Break 62a can be disposed in a portion of optical fiber $18a_1$.

In this non-limiting embodiment, first interrogator 16a functions as the primary, or master, interrogator with second interrogator 16b functioning as the secondary, or slave, interrogator. For example, second interrogator 16b will typically occupy a ready state, but will not actively interrogate optical fiber $18a_1$ unless required to do so for system testing or in the event one of the FBGs breaks and the entire length of optical fiber $18a_1$ can no longer be interrogated from one end. In a breakage event (e.g., formation of break 62a), second interrogator 16b is activated to inspect broken optical fiber $18a_1$ from the opposite side of break 62a as from first interrogator 16a.

First LRU 52a provides a replaceable segment of optical fiber to be used in overheat detection system 10. First connector 54a attaches and connects optical fiber $18a_1$ to first interrogator 16a. Second connector 56a attaches and connects optical fiber $18a_1$ to second interrogator 16b. Overheat FBG sensors 58a reflect a specific range of wavelength of light in order to detect if an overheat condition is present at the locations of each of overheat FBG sensors 58a along optical fiber $18a_1$. Temperature FBG sensors 60a reflect a specific range of wavelength of light in order to sense a current temperature of the locations of each of overheat FBG sensors 58a along optical fiber $18a_1$. Break 62a is the result of, e.g., physical trauma, fatigue, or other damage experienced by optical fiber $18a_1$ and has the effect of corrupting or blocking an optical signal sent through optical fiber $18a_1$.

Incorporating several and separate LRUs into overheat detection system 10 enables sensing and detecting throughout various regions of aircraft 12. Separating the optical fiber into separate LRUs also enables ease of replacement of individual LRUs as compared to the possible need to remove the entirety of an optical fiber in an overheat detection system that uses a single optical fiber for all zones of aircraft 12. Additionally, the dual-interrogator configuration depicted in FIG. 4A enables optical fiber $18a_1$ to be optically probed from both ends of optical fiber $18a_1$. This capability and functionality is beneficial because if optical fiber $18a_1$ becomes damaged and sustains, e.g., break 62a, optical signals can be sent from either side of break 62a. Accordingly, techniques of this disclosure can enable overheat detection system 10 to gather data from the FBGs located on both sides of break 62a, rather than a single side as in a configuration incorporating only a single interrogator on one end of the optical fiber.

FIG. 4B is a simplified block diagram of left LRU 52L and right LRU 52R and shows first interrogator 16a, second interrogator 16b, left LRU 52L (including optical fiber 18L, first connector 54L, second connector 56L, overheat FBG sensors 58L, and temperature FBG sensors 60L), and right LRU 52R (including optical fiber 18R, first connector 54R, second connector 56R, overheat FBG sensors 58R, and temperature FBG sensors 60R, and break 62 in optical fiber 18R). Left LRU 52L and right LRU 52R are substantially similar to first LRU 52a from FIG. 4A. In FIG. 4B, left LRU 52L and right LRU 52R are connected to each other in an end-to-end arrangement. Left second connector 56L of left LRU 52L is connected to right first connector 54R of right LRU 52R. In this non-limiting embodiment, two consecutive LRUs are shown connected in series. In other non-limiting embodiments, more than two LRUs can be connected consecutively and serially to form a chain of multiple LRUs that can extend throughout various or all zones of aircraft 12.

Figure 5A:
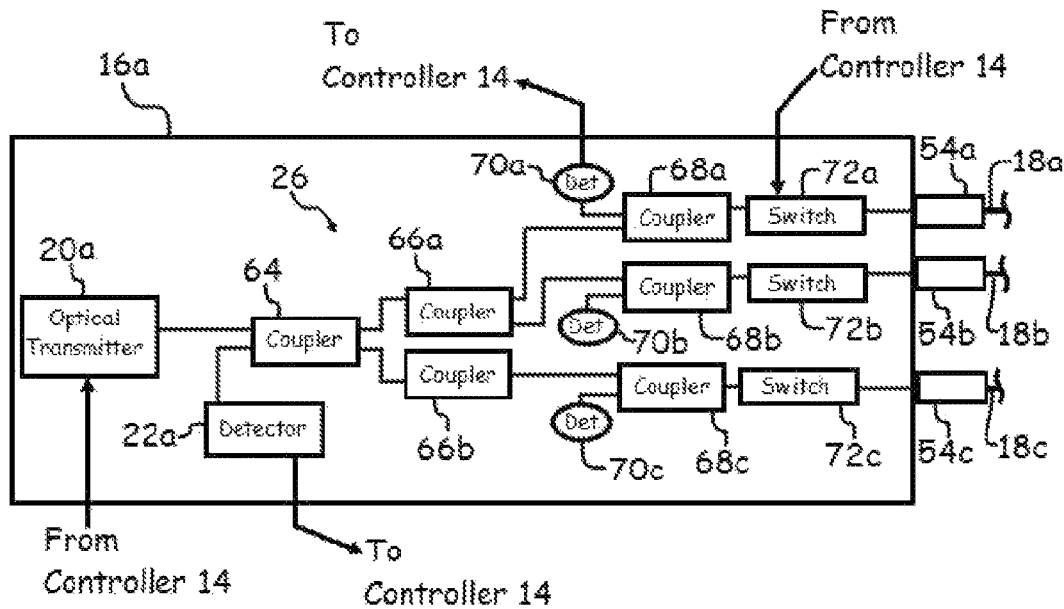
FIG. 5A is a block diagram of a multi-channel interrogator with optical switches positioned downstream of couplers.

FIG. 5A is a block diagram of interrogator 16a and shows interrogator 16a (with optical transmitter 20a, detector 22a, couplers 26 (including first tier coupler 64, second tier couplers 66a and 66b, and third tier couplers 68a, 68b, and 68c), detectors 70a, 70b, and 70c, and optical switches 72a, 72b, and 72c) and first, second, and third optical fibers 18a, 18b, and 18c (with respective first connectors 54a, 54b, and 54c).

Interrogators 16a and 16b (shown in FIGS. 4A and 4B) are substantially similar, and for ease of discussion, interrogator 16a with optical transmitter 20a, detector 22a, and computer-readable memory 24a will be discussed in further detail with reference to FIG. 5A. First tier coupler 64, second tier couplers 66a and 66b, and third tier couplers 68a, 68b, and 68c are optical devices with one or more optical inputs and one or more optical outputs, and which are capable of splitting an optical signal into multiple channels. Detectors 70a, 70b, and 70c are receivers configured to receive an optical signal. Optical switches 72a, 72b, and 72c are in-line devices that are configured to selectively block optical signals.

Controller 14 (shown in FIG. 1) is operatively connected to interrogator 16a, such that optical transmitter 22a and switches 72a, 72b, and 72c receive signals from controller 14 and detectors 22a, 70a, 70b, and 70c send signals to controller 14. First tier coupler 64 is disposed in first interrogator 16a and is optically connected to optical transmitter 20a, to detector 22a, and to second tier couplers 66a and 66b. Second tier coupler 66a is disposed in first interrogator 16a and is optically connected to first tier coupler 64 and to third tier couplers 68a and 68b. Second tier coupler 66b is disposed in first interrogator 16a and is optically connected to first tier coupler 64 and to third tier coupler 68c. Third tier coupler 68a is disposed in first interrogator 16a and is optically connected to second tier coupler 66a, to detector 70a, and to optical switch 72a. Third tier coupler 68b is disposed in first interrogator 16a and is optically connected to second tier coupler 66a, to detector 70b, and to optical switch 72b. Third tier coupler 68c is disposed in first interrogator 16a and is optically connected to second tier coupler 66b, to detector 70c, and to optical switch 72c.

Detector 70a is disposed in first interrogator 16a and is optically connected to third tier coupler 68a. Detector 70b is disposed in first interrogator 16a and is optically connected to third tier coupler 68b. Detector 70c is disposed in first interrogator 16*a* and is optically connected to third tier coupler 68*c*. Optical switch 72*a* is disposed in first interrogator 16*a* and is optically connected to third tier coupler 68*a* and to first connector 54*a*. Optical switch 72*b* is disposed in first interrogator 16*a* and is optically connected to third tier coupler 68*b* and to first connector 54*b*. Optical switch 72*c* is disposed in first interrogator 16*a* and is optically connected to third tier coupler 68*c* and to first connector 54*c*. In this non-limiting embodiment, optical switches 72*a*, 72*b*, and 72*c* are disposed downstream from couplers 26 (with a downstream direction flowing from optical transmitter 20*a* in a left to right direction as shown in FIG. 5A). In this non-limiting embodiment, optical switches 72*a*, 72*b*, and/or 72*c* for channel isolation are needed for a dual-ended interrogation configuration specifically.

In this non-limiting embodiment, detector 22*a* is used for a TDM portion of overheat detection system 10. First tier coupler 64, second tier couplers 66*a* and 66*b*, and third tier couplers 68*a*, 68*b*, and 68*c* split optical signals originating from optical transmitter 20*a* and distribute the split optical signals to optical fibers 18*a*, 18*b*, and 18*c*. First tier coupler 64, second tier couplers 66*a* and 66*b*, and third tier couplers 68*a*, 68*b*, and 68*c* are also configured to receive multiple return signals from optical fibers 18*a*, 18*b*, and 18*c* and merge the return signals into a single channel connected to detector 22*a*.

Detectors 70*a*, 70*b*, and 70*c* detect optical signals received from individual optical fibers 18*a*, 18*b*, and 18*c*. In this non-limiting embodiment, detectors 70*a*, 70*b*, and 70*c* are used for a WDM mode for each of optical fibers 18*a*, 18*b*, and 18*c*. Optical switches 72*a*, 72*b*, and 72*c* selectively block optical signals from passing across optical switches 72*a*, 72*b*, and 72*c*. Optical switches 72*a*, 72*b*, and 72*c* are controlled to turn off each channel independently at first interrogator 16*a* (and likewise at second interrogator 16*b* with similar or identical components).

In a dual-interrogator configuration (as shown in FIGS. 4A and 4B) with both interrogators scanning at the same time, simultaneous operation of both interrogators can result in difficulty in measuring the reflected signals from the FBG chain due to the multiple signals crossing-over on each respective channel (or optical fiber). If one of optical fibers 18*a*, 18*b*, or 18*c* sustains a break, second interrogator 16*b* can be activated due to the break in the optical fiber preventing the optical signal from reaching the far end of the optical fiber. However, the channels, or optical fibers, that are not broken will have the problem of seeing the optical signal from the second interrogator as there is nothing stopping the cross talk from the second optical signal. As such, additional isolation of the channels is preferable to enable dual ended interrogation for these types of systems.

Optical switches 72*a*, 72*b*, and 72*c* can be controlled to turn off each channel (e.g., optical fibers 18*a*, 18*b*, and 18*c*) independently, and at each of first and second interrogators 16*a* and 16*b*. Such a configuration of first interrogator 16*a* with optical switches 72*a*, 72*b*, and 72*c* allows for the use of a single laser (e.g., optical transmitter 20*a*) while also providing channel independence between each of optical fibers 18*a*, 18*b*, and 18*c*. Optical switches 72*a*, 72*b*, and 72*c* are independently controlled to allow channel isolation as needed. In one non-limiting embodiment, if first interrogator 16*a* detects that an optical fiber is open (e.g., damaged, or otherwise not transmitting a signal), second interrogator 16*b* will awake from a standby mode in response to a communication from first interrogator 16*a*. Only the open optical fiber will be interrogated (i.e., illuminated by optical transmitter 20*b* in second interrogator 16*b*), while signals through the remaining optical fibers will be controlled (i.e., blocked) by optical switches 72*a*, 72*b*, and/or 72*c*.

Figure 5B:
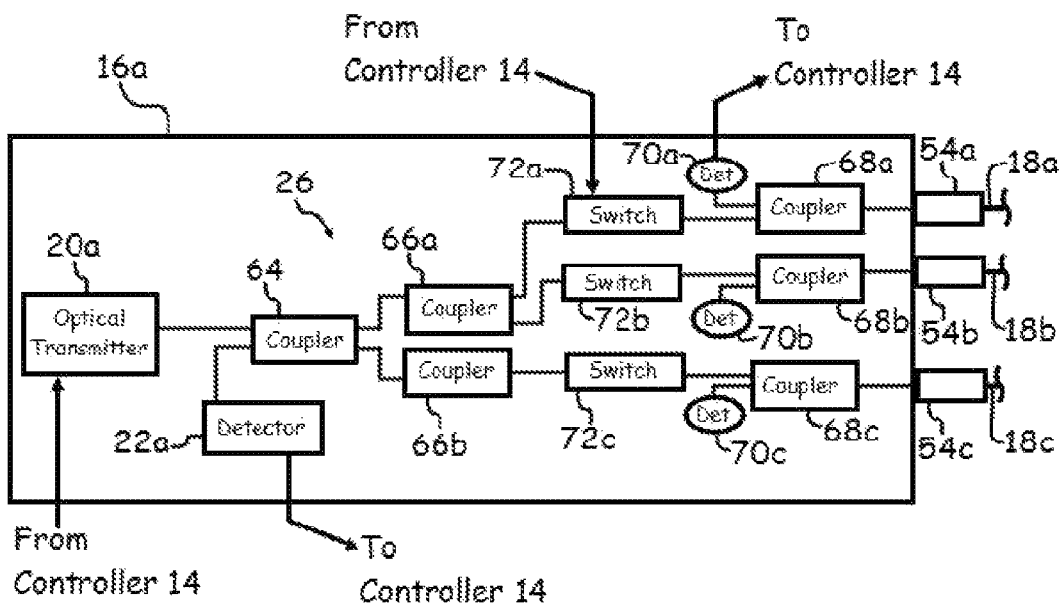
FIG. 5B is a block diagram of a multi-channel interrogator with optical switches positioned upstream of couplers.

FIG. 5B is a block diagram of first interrogator 16*a* with optical switches 72*a*, 72*b*, and 72*c* positioned upstream of third tier couplers 68*a*, 68*b*, and 68*c*. FIG. 5B shows interrogator 16*a* (with optical transmitter 20*a*, detector 22*a*, couplers 26 (including first tier coupler 64, second tier couplers 66*a* and 66*b*, and third tier couplers 68*a*, 68*b*, and 68*c*), detectors 70*a*, 70*b*, and 70*c*, and optical switches 72*a*, 72*b*, and 72*c*) and first, second, and third optical fibers 18*a*, 18*b*, and 18*c* (with respective first connectors 54*a*, 54*b*, and 54*c*). In FIG. 5B, optical switches 72*a*, 72*b*, and 72*c* are disposed between second tier couplers 66*a* and 66*b* and third tier couplers 68*a*, 68*b*, and 68*c*. This configuration is different than the configuration in FIG. 5A that includes third tier couplers 68*a*, 68*b*, and 68*c* disposed between second tier couplers 66*a* and 66*b* and optical switches 72*a*, 72*b*, and 72*c*.

The alternate configuration shown in FIG. 5B, (i.e., having optical switches 72*a*, 72*b*, and 72*c* located upstream of third tier couplers 68*a*, 68*b*, and 68), enables the individual detectors 70*a*, 70*b*, and 70*c* to be used as monitors for the optical signals transmitted by the opposite interrogator, which in this non-limiting embodiment is second interrogator (e.g., as shown in FIGS. 4A and 4B).

Figure 6:
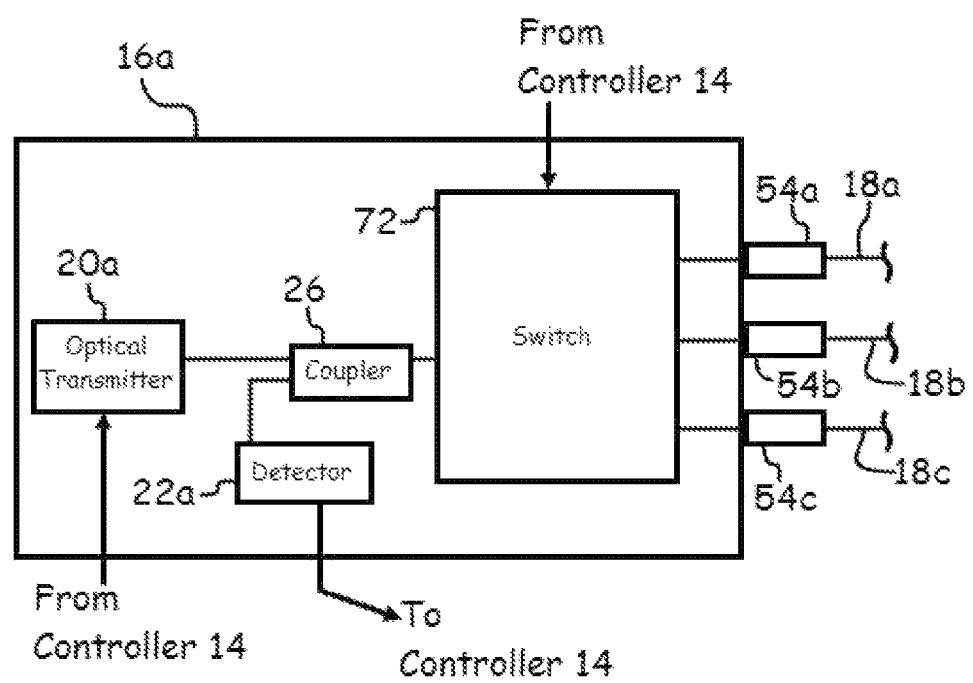
FIG. 6 is a block diagram of a multi-channel interrogator with a 1×N optical switch.

FIG. 6 is a block diagram of first interrogator with optical switch 72 configured as a 1×N optical switch. FIG. 6 shows interrogator 16*a* (with optical transmitter 20*a*, detector 22*a*, coupler 26, and optical switches 72) and first, second, and third optical fibers 18*a*, 18*b*, and 18*c* (with respective first connectors 54*a*, 54*b*, and 54*c*). In this non-limiting embodiment, optical switch 72 includes a 1×3 optical switch. In other non-limiting embodiments, optical switch 72 can include a 1×N optical switch, wherein N can equal more or less than 3 output channels. Optical switch 72 as shown in FIG. 6 provides an alternate configuration from those shown in FIGS. 5A and 5B that enable only one channel to transmitted and received at a given time (e.g., one of optical fibers 18*a*, 18,*b* or 18*c* to receive a signal at a time).

Controller 14 (shown in FIG. 1) is operatively connected to interrogator 16*a* such that optical transmitter 22*a* and switch 72 receive signals from controller 14 and detector 22*a* sends signals to controller 14. With communication between first and second interrogators 16*a* and 16*b*, first and second interrogators 16*a* and 16*b* (each with respective 1×N optical switches) can both cycle through the channels without ever simultaneously transmitting on the same channel at the same time, thereby resulting in a slower overall update rate, but requiring less components and providing a significantly better power efficiency In one non-limiting embodiment, in order to scan (i.e., reflect light by) individual temperature FBGs 60 (shown in FIGS. 4A and 4B), pulsed laser light can be used. The pulse duration is short enough that detector 22*a* only sees return signal responses from one FBG at a time. Typically, this means that the pulse duration is less than half of the time required to travel round trip (i.e., from first interrogator 16*a*, to a particular FBG, and back to first interrogator 16*a*) to the next FBG in line versus the current sensor in line. In one non-limiting embodiment, a round trip time to a FBG sensor can equate to 1 nanosecond per 10 centimeters of optical fiber length. For example, for a separation distance of 0.5 meters, the time equates to 5 nanoseconds, indicating that the pulse duration of the optical signal should be half that time duration (e.g., 5 nanoseconds) or less. Return response signals are more easily identifiable as the response signals drop to zero in between the sensor returns.

If the separation between sensors and the pulse timing is correctly identified, a typical approach would be to sample the return signal from detector 22a using an analog-to-digital converter and measure the timing the sampling rate to match the round trip time between FBG sensors. For example, for a 0.5 meter separation distance equating to a 5 nanosecond round trip time, an example sample rate would be 200 megahertz. Such a sampling rate would provide one sample value for each FBG sensor. An important part of the sampling is that the timing is such that the center of the sampling matches the time at which the pulse is centered on the sensor. If the timing is off, the response signal may be sampled during the rising edge or falling edge of the pulse, or worse yet, at that time where there is no return between pulses.

For most systems, this is a trivial problem as the timing can be defined by the distance to the start of the first FBG sensor and then repeat with equidistant sensors. In most cases, the timing for the first FBG sensor can also be defined in a calibration table in the software of an interrogator. For a non-limiting fiber optic overheat system such as overheat detection system 10, a first design criterion prevents the updating of any calibration tables after overheat detection system 10 is installed. In this non-limiting embodiment, a second design criterion is that overheat detection system 10 may require between six and ten LRU sections, each connected serially to the next using connectors (e.g., first and second connectors 54 and 56). Given that calibration of the timing between sensors may be prohibited after overheat detection system 10 is installed on aircraft 12, some options are available.

Figure 7:
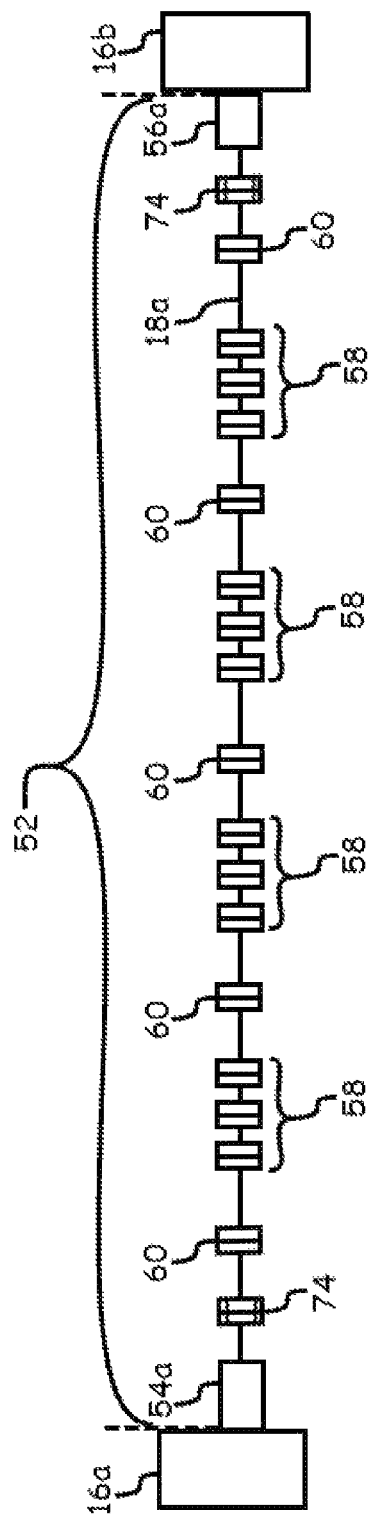
FIG. 7 is a simplified block diagram of a fiber optic event detection system with a single line replaceable unit including overheat fiber Bragg gratings, temperature fiber Bragg gratings, and timing marker fiber Bragg gratings.
Figure 8:
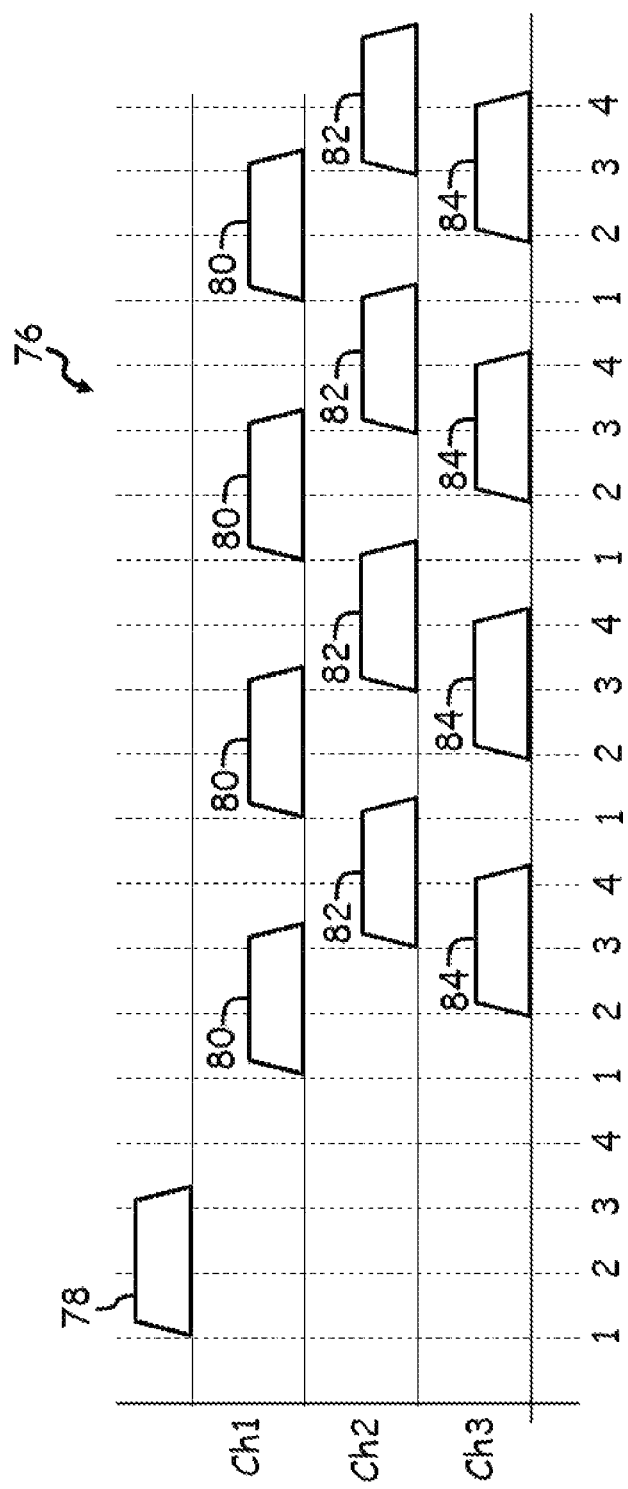
FIG. 8 is a graph depicting a response signal from the overheat detection system and a series of sample points.

Timing Markers for Fiber Sensing Systems (FIGS. 7-8)

The next portions of the disclosure refer to and discuss timing markers for fiber sensing system.

FIG. 7 is a simplified block diagram of LRU 52 and shows first interrogator 16a, second interrogator 16b, and first LRU 52 (including optical fibers 18a, first connector 54, second connector 56, overheat FBG sensors 58, temperature FBG sensors 60, and timing FBG sensors 74). LRU 52 shown in FIG. 7 is substantially similar to first LRU 52a shown in FIG. 4A, and so the discussions of the components of first LRU 52a from FIG. 4A also applies to LRU 52 shown in FIG. 7. LRU 52 additionally includes timing FBG sensors 74. Timing FBG sensors 74 are fiber Bragg grating optical sensors configured to reflect an optical signal.

Timing FBG sensors 74 are disposed in and along portions of optical fiber $18a_1$. In this non-limiting embodiment, a timing FBG sensor 74 is disposed between first connector 54a and a temperature FBG sensor 60 that is nearest to first connector 54a. Also in this non-limiting embodiment, another timing FBG sensor 74 is disposed between second connector 56a and a temperature FBG sensor 60 that is nearest to second connector 56a. In other non-limiting embodiments, there can be more or less than two temperature FBG sensors 60 disposed along LRU 52. In this non-limiting embodiment, timing FBG sensors 74 are needed for multiplexed, in some cases highly multiplexed, TDM type systems. In other non-limiting embodiments, timing FBG sensors 74 can be used with either a single interrogator or a dual interrogator (interrogator on both ends) type of design.

Timing FBG sensors 74 are disposed in and along portions of optical fiber $18a_1$ reference locations of optical fiber $18a_1$. During operation of overheat detection system 10, optical transmitter 22a (shown in FIGS. 5A-6) emits a first optical signal into optical fiber 18a via first interrogator 16a. The first optical signal is reflected by one of timing FBG sensors 74 to create a response signal. The response signal is received by detector 22a in first interrogator 16a from optical fiber 18a based upon the reflected first optical signal. The response signal is received by detector 22a after a first amount of time that defines a first time step and a first rate of the response signal. The distance from the first interrogator to the first timing fiber Bragg grating is detected. The response signal is sampled at a sampling rate that is greater than the first rate of the response signal. Sampling the response signal includes measuring the amount of the response signal with detector 22a to create sample response rate values.

The sample response rate values are compared to the response signal to identify which of the sample response rate values correspond with a local maximum of the response signal. (See e.g., FIG. 8 and related discussion). The distance from the first interrogator to the first timing fiber Bragg grating can be determined from the comparison of the sample response rate values with the detected response signal. For example, controller 14 (shown in FIG. 1) is operatively connected to first interrogator 16a and is configured to determine the reference locations of temperature FBG sensors 60 of optical fiber 18a. Overheat detection system 10 with temperature FBG sensors 60 enables first and second interrogators 16a and 16b to detect distances to specific timing FBG sensors 74 for each section of optical fiber 18a and adjust the sampling timing (or use an over-sampling method) to ensure that timing of the sampling coincides with the centers of the return pulses from timing FBG sensors 74 along optical fiber 18a. Overheat detection system 10 with temperature FBG sensors 60 adds additional FBG sensors in each sensing length of optical fiber 18a that act as timing markers to allow overheat detection system 10 to self-calibrate the timing needed to properly interrogate the sensor chains.

In order to align the sampling of the response signal with the timing of the response signal, the return signal is oversampled (sample at a higher rate) and the samples that line up with the timing of the return pulses for that section of the return signal are analyzed. FIG. 8 shows a depiction of this option.

FIG. 8 shows graph 76 including a depiction of output signal 78 from interrogator 16a and a series of sampling points of a return signal. FIG. 8 shows graph 76, output signal 78, first channel Ch1, second channel Ch2, third channel Ch3, first clock cycle 1, second clock cycle 2, third clock cycle 3, fourth clock cycle 4, first channel pulses 80, second channel pulses 82, and third channel pulses 84.

Graph 76 is a graphical representation of measures of luminous flux for signals correlating to output signal 78, first channel Ch1, second channel Ch2, and third channel Ch3 relative to first clock cycle 1, second clock cycle 2, third clock cycle 3, and fourth clock cycle 4. Output signal 78 is an optical signal sent from interrogator 16a (e.g., emitted by optical transmitter 20a) and distributed into optical fiber 18a. First channel Ch1, second channel Ch2, and third channel Ch3 are representative of separate optical fibers such as optical fibers 18a, 18b, and 18c. First clock cycle 1, second clock cycle 2, third clock cycle 3, and fourth clock cycle 4 are sequential time steps that repeat every four steps. First channel pulses 80, second channel pulses 82, and third channel pulses 84 are representative of detected amounts of light (i.e., reflected return signals from optical fibers 18a, 18b, and 18c) measured by one of detectors 70a, 70b, and 70c.

Output signal 78 is positioned on a left side of graph 76 to indicate that the start of output signal coincides with first (e.g., left-most) clock cycle 1. An amplitude, or height, and shape of output signal correspond to the amount of light and periodic nature of output signal 78 as the output signal is created and distributed into optical fibers 18a, 18b, and 18c. First channel Ch1, second channel Ch2, and third channel Ch3 represent reflected response signals from FBG sensors disposed on optical fibers 18a, 18b, and 18c. In this non-limiting embodiment, first channel Ch1, second channel Ch2, and third channel Ch3 correspond to optical fibers 18a, 18b, and 18c. In other non-limiting embodiments, more or less than three channels can be sensed.

First clock cycle 1, second clock cycle 2, third clock cycle 3, and fourth clock cycle 4 are sequential time periods that are of equal duration. First channel pulses 80, second channel pulses 82, and third channel pulses 84 are shown as being assigned to their respective channels (e.g., Ch1, Ch2, and Ch3). In relation to overheat detection system 10, first channel pulses 80, second channel pulses 82, and third channel pulses 84 correspond to detected return signals from each of fiber optics 18a, 18b, and 18c. The size, shape, and spacing of first channel pulses 80, second channel pulses 82, and third channel pulses 84 are analyzed to determine sample response rate values. As shown in FIG. 8, first channel pulses 80, second channel pulses 82, and third channel pulses 84 are shown as being shifted 90 a multiple of discrete clock cycles (i.e., representing multiples of a 90° or a π/2 phase shift).

A method of spatially synchronizing a series of timing FBG sensors 74 disposed on optical fibers 18a, 18b, and 18c includes emitting, by optical transmitter 20a, a first optical signal (e.g., output signal 78) into optical fibers 18a, 18b, and 18c. The first optical signal is reflected by timing FBG sensors 74 to create response signals. The response signals are received by detector 22a from optical fibers 18a, 18b, and 18c based upon the reflected first optical signal. The response signals are received by detector 22a after a first amount of time that defines a first time step and a first rate of the response signals. The response signal is sampled at a sampling rate that is greater than the first rate of the response signal. Sampling the response signal comprises measuring the amount of the response signal with detector 22a (or by detectors 70a, 70b, or 70c) in first interrogator 16a to create sample response rate values (i.e., measured from first channel pulses 80, second channel pulses 82, and third channel pulses 84). The sample response rate values are compared to the response signals to identify which of the sample response rate values correspond with local maximums of the response signals. From this comparison, the distance from first interrogator 16a to timing FBG sensors 74 can be detected, calculated, or determined.

For example, a sampling rate can include a rate larger than the rate of the response signal by a factor of four, so for a non-limiting embodiment with a response signal rate at 200 megahertz, a sampling of 800 megahertz could be used. Such a sampling rate would provide four samples for each required time step. In FIG. 8, the timing of when the four samples are measured/detected is represented by first clock cycle 1, second clock cycle 2, third clock cycle 3, and fourth clock cycle 4. Depending on where the pulse fell within the timing windows, those samples could see no light, see light from the rising or falling edge of the pulse, or see light from the peak of the pulse. If the pulse is roughly half the width of the timing step, at least two of the samples would fall in the 'peak' zone of the pulse. The timing marker would indicate exactly which of the samples lined up for that given sensing section. Each section would have its own 'calibration' coefficient that simply represents which of the samples (1 through 4) is used for that section of optical fiber 18a.

Timing FBG sensors 74 (e.g., as timing markers) allow for some relaxation of the manufacturing requirements for the sensing lengths, and especially the length between first connector 54a and the first temperature FBG sensor 60. Timing FBG sensors 74 effectively communicate to overheat detection system 10 where the start and finish for each LRU are in time, and such that overheat detection system 10 could ignore the space in between. Using timing FBG sensors 74 in this manner also enables the LRUs mostly immune to which end is considered front and which is back. Overheat detection system 10 is able to locate each of timing FBG sensors 74 and adjust for either installation direction. For the dual-interrogator configuration (e.g., overheat detection system 10 including first and second interrogators 16a and 16b), each of first and second interrogators 16a and 16b can conduct its own calibration measurement of optical fiber 18a and timing FBG sensors 74 would be seen in the opposite order, and first and second interrogators 16a and 16b can develop their own unique calibration numbers.

In one non-limiting embodiment, first and second interrogators 16a and 16b can be placed in their own respective wavelength channel in a WDM scheme. To ease the calibration, a broad spectral return FBG sensor could be incorporated into LRU 52 (or any of LRUs 52a, 52b, or 52c) so that a single wavelength could locate each timing FBG sensors 74 in time regardless of the temperature of those timing FBG sensors 74 (i.e., a center wavelength of an FBG shifts with temperature).

Timing FBG sensors 74 can also act as a type of bit to ensure that the various LRUs are installed in the correct locations (i.e., mistake proofing). Since the lengths of the LRUs are pre-defined, if the overeat detection system 10 were to find the separation between two timing FBG sensors 74 to not match the expected distance, an indication could be sent that the wrong LRU was installed at a specific location.

Device and Method of Calibrating Fiber Bragg Grating Based Fiber Optic Overheat Systems (FIGS. 9A-9B)

The next portions of the disclosure refer to and discuss a self-calibration method and device for fiber Bragg grating based fiber optic overheat systems.

In one non-limiting embodiment, a design criterion for overheat detection system 10 includes the ability to detect an overheat event within 5° Celsius of a threshold defined for each of zones Za-Zj of aircraft 12. The temperature sensing functionality of overheat detection system 10 also includes a 5° Celsius requirement for accuracy. A typical FBG sensor has a nominal relationship of 10 picometers of wavelength shift per degree Celsius. A 5° Celsius accuracy thus requires the ability to stay within a 50 picometer window in wavelength to maintain the 5° Celsius. Existing manufacturing capabilities of FBG sensors are able to write gratings with a center wavelength accuracy of 0.1 nanometers or 100 picometers. In other existing techniques, the accuracies of the center wavelength can be better than 0.1 nanometer, in some instances as low as 0.01 nanometers or 10 picometers. However, in this non-limiting embodiment, neither of these accuracy values will allow overheat detection system 10 to achieve the requisite temperature accuracies without calibrating the sensors in some manner.

In this non-limiting embodiment, a method to auto-calibrate the sensing FBG sensing system is provided that meets a design criterion requires avoidance of the use of calibration tables each time a FBG sensor LRU is installed or replaced.

In this non-limiting embodiment, with the criterion for the sensor accuracy (e.g., +/−5° Celsius accuracy (i.e., 50 picometer) requirement), existing scales of the manufacturing capability of FBG sensors (e.g., +/−100 picometer center wavelength capability) are not that far off of the accuracy requirements. Depending on the statistics of accuracy and manufacturing variation, existing capabilities differ by a factor of 2 to a factor of 8 from the required capabilities. This factor of 2 to 8 eases the calibration requirements, with the factor of 8 providing a worst case scenario. If the FBG sensors could be tested after the FBG sensors are manufactured and annealed to their final starting wavelength using a fixed, known temperature bath, a nominal calibration value for those FBG sensors could be obtained. Using such a value, there would only be a need to place each FBG sensor in one of eight buckets (i.e., identification or classification regions) to describe the starting center wavelength for a FBG sensor. If the nominal calibration value was conveyed to the interrogator, the interrogator could use the nominal calibration value to improve overall accuracy to the level needed by a specific embodiment.

Overheat detection system 10 with calibration FBG sensors 86 enables a method to have each of calibration FBG sensors 86 tell first or second interrogators 16a or 16b what its individual calibration values are so that overheat detection system 10 can meet the accuracy requirements. In one non-limiting embodiment, there is an underlying assumption that each of optical fibers 18a, 18b, and 18c contain FBGs with an overall center wavelength variation closer to (i.e., less than) the 10 picometer value that is provided by manufacturers as a possible variance for a single optical fiber with a plurality of FBG sensors. The method includes conveying a value from 1-8 that represents which bin the starting wavelength resides in for a particular FBG chain (i.e. a particular one of optical fibers 18a, 18b, or 18c). These values can be represented in a 3 bit binary sequence. First interrogator 16a detects and/or senses that 3 bit sequence from detector 22a, overheat detection system 10 can calibrate itself based upon the 3 bit sequence.

FIG. 9A is a simplified block diagram of LRU 52 and shows first interrogator 16a, second interrogator 16b, and first LRU 52 (including optical fibers 18a, first connector 54, second connector 56, overheat FBG sensors 58, temperature FBG sensors 60, timing FBG sensors 74, and calibration FBG sensors 86 disposed in a first pattern). LRU 52 shown in FIG. 9A is substantially similar to LRU 52 shown in FIG. 7, and so the discussions of the components of LRU 52 from FIG. 7 also applies to LRU 52 here shown in FIG. 9A. LRU 52 additionally includes calibration FBG sensors 86. FIG. 9B is a simplified block diagram of LRU 52 and shows first interrogator 16a, second interrogator 16b, and first LRU 52 (including optical fibers 18a, first connector 54, second connector 56, overheat FBG sensors 58, temperature FBG sensors 60, timing FBG sensors 74, and calibration FBG sensors 86 disposed in a first pattern). FIGS. 9A and 9B are substantially similar, and for ease of discussion will be discussed mostly in unison (with a portion of the discussion identifying the differences between the two).

Calibration FBG sensors 86 are fiber Bragg grating optical sensors configured to reflect an optical signal. Calibration FBG sensors 86 are disposed in and along portions of optical fiber $18a_1$. In the non-limiting embodiment shown in FIG. 9A, calibration FBG sensors 86 are located on the ends of optical fiber 18a and in a position relative to the other FBG sensors on optical fiber 18A that is closest to first connector 54a and second connector 56a. Calibration FBG sensors 86 are shown as being disposed adjacent to timing FBG sensors 74. In the non-limiting embodiment shown in FIG. 9B, calibration FBG sensors 86 are located in multiple positions of optical fiber 18a between overheat FBG sensors 58 and temperature FBG sensors 60. In both of these non-limiting embodiments, there are multiple calibration FBG sensors 86 disposed on optical fiber 18a. In other non-limiting embodiments, there can be two or more calibration FBG sensors 86 disposed on optical fibers 18a, 18b, and or 18c.

As shown in FIGS. 9A and 9B, overheat detection system 10 with calibration FBG sensors 86 uses additional FBGs (i.e., calibration FBG sensors 86) as calibration markers in optical fiber 18a at set distances or in set wavelength locations along optical fiber 18a to act as bits in a 3 bit word (e.g., calibration constant) that first and second interrogators 16a and 16b interrogator can read to get the calibration constant. In one non-limiting embodiment, two calibration constants are utilized, one calibration constant for overheat FBG sensors 58 and one calibration constant for temperature FBG sensors 60. Alternatively or additionally, if there is room or space in the wavelength or spatial regime to write more bits, the calibration constant could consist of 4 or more bits. It is also possible that 2 or even 1 bit calibration constants will suffice. FIGS. 9A and 9B show how these concepts can be applied for a system using wavelength bins (one per bit) or a spatial arrangement in a single wavelength bin where the location represents each bit. In the system using spatial arrangement, the spatial location could be referenced to timing FBG sensors 74 that are used to synchronize the pulse timing for the distributed sensing system. In this non-limiting embodiment, overheat detection system 10 with calibration FBG sensors 86 can be useful for any FBG system (WDM, TDM, etc.) where there is an opportunity to write additional gratings into the sensing fiber that can be used for calibration. In other non-limiting embodiments, calibration FBG sensors 86 can be used with either a single interrogator or a dual interrogator (interrogator on both ends) type of design.

In either of the approaches depicted in the configurations shown in FIGS. 9A and 9B, a binary '1' would indicate when a calibration FBG sensor 86 is present at a reference location and a '0' would indicate when there is not a calibration FBG sensor 86 in the reference location. In one non-limiting embodiment, calibration FBG sensors 86 can be used as part of a WDM configuration. An advantage of a wavelength based approach (i.e., WDM) is that WDM enables bi-directional sensing of the optical fiber. For example, it wouldn't matter from which side optical fiber 18a is interrogated, there would be no ambiguity in the values. Since most interrogators have a limit on the wavelengths they interrogate across, use of a WDM process could limit the number of zones that can be used in overheat detection system 10. In another non-limiting embodiment, a spatial process approach only requires one wavelength bin, thus easing the requirement of needing a requisite amount of available wavelength ranges. However, the direction optical fiber 18a is interrogated becomes important. If fiber optic 18a is interrogated from different directions, the binary word would appear 'backwards'. To overcome this, an option is to write two timing FBG sensors 74 on one end of optical fiber 18a and only one timing FBG sensors 74 on the other end of optical fiber 18a. This use and orientation of timing FBG sensors 74 would define what the forward and backward directions are.

In one non-limiting embodiment, portions of overheat detection system 10 include optical fiber sensing segments (e.g., series of consecutive LRUs) of approximately 5 meters. In a system that can monitor FBG sensors every 0.5 meters (as may desired in the temperature sensing portion of the system), this allows for as many as eleven calibration bits in that section. If overheat detection system 10 should require significantly shorter sensing lengths, that requirement could impact the ability to create enough bits in that LRU. It is likely that such an instance would need to be handled with WDM approach. Some combination of wavelength and spatial distribution is also possible (e.g., WDM, TDM, and/or a combination of WDM and TDM).

In another non-limiting embodiment, a second optical transmitter (e.g., laser) can be added at a different set of wavelengths to overheat detection system 10 (e.g., such as adding an L-band laser to a C-band system, etc.). Calibration FBG sensors 86 could be written into optical fiber 18a for those new wavelengths from the second optical transmitter, thus eliminating a concern of using sensing wavelengths for calibration. This could add some WDM elements and a second high speed detector to overheat detection system 10 as well. In another non-limiting embodiment, Calibration FBG sensors 86 would be written into optical fiber 18a after any sensing FBGs (e.g., thermal, temperature, and/or timing FBG sensors) are written into optical fiber 18a and annealed (so fixed in wavelength). As such, a manufacturing process can include a two-step process with both of those two steps completed before any cabling is applied to optic cable 18a.

In one non-limiting embodiment, calibration information determined by optical fiber 16a refers to center wavelengths of each of any of the FBGs (overheat or temperature) in optical fiber 16a. FBGs (e.g., overheat FBG sensors 58a and temperature FBG sensors 60a) are written into optical fiber 16a with an expected center wavelength designed at some starting temperature (e.g., 25° Celsius). During operation of overheat detection system 10, the center wavelength(s) of the FBGs corresponding to that starting temperature can move around by 0.1 to 0.2 nanometers. Since 1° Celsius can cause about 10 picometers of wavelength shift, that 0.1 to 0.2 nanometer variation can result in errors of 10° to 20° Celsius. As such, calibration FBG sensors 86 can be used to calibrate overheat detection system 10 by telling overheat detection system 10 something about the starting center wavelength(s) for optical fiber 16a. The starting temperature variations are divided into smaller buckets (e.g., eight buckets) so that the error goes from 10° to 20° Celsius down to 10° to 2.5° Celsius by identifying which of the eight buckets the center wavelength(s) fell into. In this non-limiting example, the eight buckets can be described by a three bit word. So, we would write three calibration FBG sensors 86 into optical fiber 16a that represent the bits in that word. In another non-limiting embodiment, in order to provide calibration for both overheat and temperature FBG sensors 58 and 60, there could be a total of three calibration FBG sensors 86 for each type of overheat and temperature FBG sensors 58 and 60 or six total calibration FBG sensors 86 representing the calibration bits.

Discussion of Possible Embodiments

The following are non-exclusive descriptions of possible embodiments of the present invention.

A system configured to monitor temperature in a plurality of zones of an aircraft includes an optical fiber with first and second ends, first and second connectors, and a first interrogator. The optical fiber includes a plurality of fiber Bragg gratings disposed in the optical fiber. The first connector is disposed on the first end of the optical fiber and the second connector is disposed on the second end of the optical fiber. The first interrogator is connected to the first connector and includes an optical switch. The optical switch is in optical communication with the first connector of the optical fiber and is configured to selectively block transmission of the optical signal to the optical fiber to prevent the optical fiber from receiving the optical signal from the interrogator.

The system of the preceding paragraph can optionally include, additionally and/or alternatively, any one or more of the following features, configurations and/or additional components.

A second interrogator can be connected to the second connector of the optical fiber, wherein the system can be configured to allow monitoring of temperature in the plurality of zones from either of the first or second interrogators.

An optical transmitter can be configured to provide an optical signal to the optical fiber, a first detector can be configured to receive an optical response from the optical fiber, and/or a coupler can be connected to the optical transmitter and/or to the detector, wherein the coupler can be in optical communication with the optical switch.

A controller can be operatively connected to the detector and/or be configured to determine at least one temperature for each of the plurality of zones based on the optical response and/or output an indication for detected zones of the plurality of zones in which the at least one temperature can be greater than a threshold value.

The controller can be configured to control the optical transmitter and/or determine the at least one temperature for each of the plurality of zones using at least one of time division multiplexing (TDM) and wavelength division multiplexing (WDM).

The aircraft system can be a bleed air system, and wherein the plurality of zones can comprise bleed air ducts.

The optical transmitter can be configured to provide the optical signal as at least one of a tunable swept-wavelength laser and a broadband laser.

A plurality of optical fibers, wherein the first interrogator can include a plurality of optical switches, wherein each optical switch can corresponds to one of each of the optical fibers, wherein the optical switches can be configured to control blockage of the optical signal from the optical transmitter to the plurality of optical fibers.

The optical fiber can comprise a plurality of line replaceable units each including an optical fiber portion, a pair of connectors, and/or a plurality of fiber Bragg gratings that can be disposed on the fiber optic portion.

A method of detecting thermal conditions for a plurality of zones of an aircraft system includes emitting, by a first optical transmitter disposed in a first interrogator, a first optical signal. The first optical signal is distributed into an optical fiber by a first coupler. The first optical signal is selectively blocked by an optical switch in the first interrogator from being transmitted into the optical fiber. A second optical signal is emitted by a second optical transmitter disposed in a second interrogator into the optical fiber. A response signal based upon the second optical signal is received from the optical fiber by a second optical receiver in the second interrogator. At least one temperature, based upon the response signal, for a portion of the plurality of zones is determined using at least one of the first and second interrogators.

The method of the preceding paragraph can optionally include, additionally and/or alternatively, any one or more of the following steps, features, configurations and/or additional components.

The first optical signal can be distributed by a first coupler into a plurality of optical fibers; an optical switch in the first interrogator can selectively block the first optical signal from being transmitted into at least one of the plurality of optical fibers; a second optical transmitter disposed in a second interrogator can emit a second optical signal into the plurality of optical fibers; a second optical receiver in the second interrogator can receive a response signal from the optical fibers based upon the second optical signal; and/or a controller can determine at least one temperature for a portion of the plurality of zones based upon the response signal.

The optical fiber can include fiber Bragg gratings, and/or wherein emitting, by either the first or second optical transmitters, the first and second optical signals can comprise emitting the optical signal using at least one of a tunable, swept-wavelength laser and a broadband laser; and/or wherein determining, using the controller, the at least one temperature for each of the plurality of zones can comprise determining the at least one temperature based on at least one of time division multiplexing (TDM) and wavelength division multiplexing (WDM).

A first portion of the optical fiber can be monitored with the first optical signal up to a break in the optical fiber, wherein the first portion of the optical fiber can extend from the first interrogator to the break in the optical fiber; and/or a second portion of the optical fiber can be monitored with the second optical signal up to the break in the optical fiber, wherein the second portion of the optical fiber can extend from the second interrogator to the break in the optical fiber.

The first optical switch of the first interrogator and/or a second optical switch of the second interrogator can be opened in response to a break in a portion of the optical fiber, wherein the second optical switch can be in optical communication with the optical fiber on an end of the optical fiber opposite from the first interrogator.

A detection system includes an optical fiber, a first connector, a second connector, a first interrogator, a second interrogator, and a controller. The optical fiber includes a first end, a second end, and a plurality of fiber Bragg gratings disposed in the optical fiber. The first connector is disposed on the first end of the optical fiber and the second connector is disposed on the second end of the optical fiber. Each of the first and second interrogators include an optical transmitter, a detector, and an optical switch. The optical transmitter is configured to emit an optical signal. The first detector is configured to receive an optical response from the optical fiber. The optical switch is in optical communication with the optical fiber and is configured to selectively block transmission between the optical fiber and both the optical transmitter and the detector to prevent the detector of one of the first interrogator and the second interrogator from receiving a signal from the optical transmitter of the other of the first interrogator and the second interrogator.

The system of the preceding paragraph can optionally include, additionally and/or alternatively, any one or more of the following features, configurations and/or additional components.

The detection system can be configured to allow the optical switches of both the first and second interrogators to allow transmission of an optical signal when a break in the optical fiber is detected.

The detection system can be configured to be used in an aircraft, wherein the plurality of zones of the optical fiber can relate to a plurality of zones in the aircraft.

The optical fiber, the first connector, and the second connector can make up a line replaceable unit, wherein the system can comprise a plurality of line replaceable units that can be configured to be disposed throughout a plurality of zones of the aircraft.

The controller can be configured to control the optical transmitter and/or determine the at least one temperature for each of the plurality of zones using at least one of time division multiplexing (TDM) and wavelength division multiplexing (WDM).

A plurality of overheat fiber Bragg gratings can be disposed in the optical fiber; a plurality of temperature fiber Bragg gratings can be disposed in the optical fiber, wherein the plurality of temperature fiber Bragg gratings can be interspersed between the plurality of overheat fiber Bragg gratings; and/or a first timing fiber Bragg grating can be disposed in the optical fiber at a reference location of the optical fiber.

A system configured to monitor a plurality of zones of an aircraft includes a first connector, a second connector, an optical fiber, a first interrogator, and a controller. The first and second connectors are in optical communication. The optical fiber can extend between the first and second connectors, the optical fiber with first and second ends, wherein the first end of the optical fiber is connected to the first connector, wherein the optical fiber comprises: a first timing fiber Bragg grating disposed in the optical fiber at a reference location of the optical fiber. The first interrogator is connected to the first end of the optical fiber and is configured to provide a first optical signal to the optical fiber and to receive a first timing signal from the optical fiber. The first timing fiber Bragg grating is configured to provide the first timing signal with information related to the first timing fiber Bragg grating. The controller is operatively connected to the first interrogator and configured to determine the reference location of the optical fiber based on the first timing signal received by first interrogator.

The system of the preceding paragraph can optionally include, additionally and/or alternatively, any one or more of the following features, configurations and/or additional components.

A plurality of temperature fiber Bragg gratings can be disposed in the optical fiber.

A second interrogator can be connected to the second end of the optical fiber, wherein the second interrogator can be configured to provide a second optical signal to the optical fiber and to receive a second timing signal from the optical fiber.

A second timing fiber Bragg grating can be disposed in the optical fiber, wherein the second timing fiber Bragg grating can be configured to indicate a second reference location of the optical fiber.

The optical fiber, the first connector, and the second connector can make up a line replaceable unit, wherein the system can comprise a plurality of line replaceable units disposed throughout the plurality of zones of the aircraft.

The first timing fiber Bragg grating can be configured to indicate a start point of a line replaceable unit, and wherein the second timing fiber Bragg grating can be configured to indicate a finish point of the line replaceable unit.

A method of spatially synchronizing a series of sensors disposed on an optical fiber in a system includes emitting, by a first optical transmitter disposed in a first interrogator connected to the optical fiber, a first optical signal into the optical fiber. The optical fiber includes a plurality of fiber Bragg gratings disposed in the optical fiber and a first timing fiber Bragg grating disposed in the optical fiber at a distance from the first interrogator. The first optical signal is reflected with the first timing fiber Bragg grating to create a response signal. The response signal is received by a first optical receiver in the first interrogator from the optical fiber based upon the reflected first optical signal, wherein the response signal is received by the first optical receiver after a first amount of time defining a first time step and a first rate of the response signal. The response signal is sampled at a sampling rate that is greater than the first rate of the response signal. Sampling the response signal includes measuring the amount of the response signal with a detector in the first interrogator to create sample response rate values. The sample response rate values are compared to the response signal to identify which of the sample response rate values correspond with a local maximum of the response signal.

The method of the preceding paragraph can optionally include, additionally and/or alternatively, any one or more of the following steps, features, configurations and/or additional components.

The first optical signal can comprise pulsed laser light.

The distance from the first interrogator to the first timing fiber Bragg grating can be determined.

The plurality of fiber Bragg gratings can comprise a plurality of temperature fiber Bragg gratings disposed in the optical fiber.

The sampling rate that can be greater than the first rate of the response signal by a factor of two or more.

The optical fiber, the first connector, and/or the second connector can make up a line replaceable unit, wherein the system can comprise a plurality of line replaceable units disposed throughout a plurality of zones of an aircraft.

A start point of a line replaceable unit can be located based on the sample response rate values, wherein the line replaceable unit can comprise: a portion of the optical fiber; a first connector can be connected to a first end of the portion of the optical fiber; a second connector can be connected to a second end of the portion of the optical fiber; a second timing fiber Bragg grating can be configured to indicate a finish point of the line replaceable unit based on the sample response rate values; and/or the finish point of the line replaceable unit can be located.

An overheat detection system includes first and second connectors in optical communication, an optical fiber, first and second interrogators, and a controller. The optical fiber extends between the first and second connectors and includes first and second ends, with the first end of the optical fiber is connected to the first connector. The optical fiber includes a plurality of temperature fiber Bragg gratings, a first timing fiber Bragg grating, and a second timing fiber Bragg grating. The first timing fiber Bragg grating is disposed in the optical fiber at a reference location of the optical fiber. The second timing fiber Bragg grating is disposed in the optical fiber and is configured to indicate a second reference location of the optical fiber. The first interrogator is connected to the first end of the optical fiber and is configured to provide a first optical signal to the optical fiber and to receive a first timing signal from the optical fiber. The first timing fiber Bragg grating is configured to provide the first timing signal that includes information related to the first timing fiber Bragg grating from the first interrogator. The second interrogator is connected to the second end of the optical fiber and is configured to provide a second optical signal to the optical fiber and to receive a second timing signal from the optical fiber. The controller is operatively connected to the first interrogator and is configured to determine the reference location of the optical fiber based on the first timing signal received by the first interrogator.

The system of the preceding paragraph can optionally include, additionally and/or alternatively, any one or more of the following features, configurations and/or additional components.

The detection system can be configured to be installed in an aircraft.

The optical fiber, the first connector, and/or the second connector can make up a line replaceable unit, wherein the system can comprise a plurality of line replaceable units configured to be disposed throughout a plurality of zones of the aircraft.

The first interrogator can further include: an optical transmitter configured to provide the optical signal to the optical fiber; a first detector configured to receive a response signal from the optical fiber; and/or a coupler connected to the optical transmitter and/or to the detector.

An optical switch can be in optical communication with the first connector of the optical fiber, wherein the optical switch can be configured to selectively block transmission of the optical signal to the optical fiber.

The controller can be configured to control the optical transmitter and determine the at least one temperature for each of the plurality of zones using at least one of time division multiplexing (TDM) and wavelength division multiplexing (WDM).

A system configured to monitor a plurality of zones of an aircraft includes a line replaceable unit, a first interrogator, and a controller. The line replaceable unit includes first and second connectors in optical communication and an optical fiber extending between the first and second connectors. The first end of the optical fiber is connected to the first connector. The optical fibers includes a first plurality of fiber Bragg gratings disposed in the optical fiber and a plurality of calibration fiber Bragg gratings located in a pattern that provides information related to a calibration value of the line replaceable unit based upon a center wavelength of each of the first plurality of fiber Bragg gratings. The first interrogator is connected to the line replaceable unit at the first end of the optical fiber and is configured to provide a first optical signal to the optical fiber and to receive a first optical response signal from the optical fiber. The controller is operatively connected to the first interrogator and is configured to determine the calibration value of the line replaceable unit.

The system of the preceding paragraph can optionally include, additionally and/or alternatively, any one or more of the following features, configurations and/or additional components.

A plurality of overheat fiber Bragg gratings can be disposed in the optical fiber.

The plurality of calibration fiber Bragg gratings can be further configured to indicate a first calibration value, wherein the first calibration value can be based upon center wavelengths of the plurality of overheat fiber Bragg gratings.

A second optical transmitter can be optically connected to the optical fiber, wherein the second optical transmitter can be configured to provide a second optical signal to the optical fiber.

The second optical transmitter can be disposed in a second interrogator connected to the second end of the optical fiber, wherein the second interrogator can be configured to provide the second optical signal to the optical fiber and to receive a second optical response from the optical fiber.

The first interrogator can comprise: an optical transmitter configured to provide an optical signal to the optical fiber; and/or a first detector configured to receive an optical response from the optical fiber, wherein the first detector can be operatively connected to the controller.

The system can comprise a plurality of line replaceable units disposed throughout the plurality of zones of the aircraft.

A plurality of temperature fiber Bragg gratings can be disposed in the optical fiber, wherein the plurality of temperature fiber Bragg gratings can be interspersed between the plurality of overheat fiber Bragg gratings.

The plurality of temperature fiber Bragg gratings can be further configured to indicate a second calibration value, wherein the second calibration value can be based upon center wavelengths of the plurality of temperature fiber Bragg gratings.

A method of calibrating a fiber optic overheat system includes emitting a first optical signal into the optical fiber with a first optical transmitter disposed in a first interrogator connected to an optical fiber. The optical fiber includes a plurality of overheat fiber Bragg gratings disposed in the optical fiber, and a plurality of calibration fiber Bragg gratings disposed in the optical fiber. The first optical signal is reflected with at least one of the plurality of calibration fiber Bragg gratings to create a response signal. The response signal from the optical fiber based upon the reflected first optical signal is received by a first optical receiver in the first interrogator. The received response signal is detected to identify presences of each of the plurality of calibration fiber Bragg gratings. A calibration value is determined based upon the identified presences of the plurality of calibration fiber Bragg gratings.

The method of the preceding paragraph can optionally include, additionally and/or alternatively, any one or more of the following steps, features, configurations and/or additional components.

A plurality of temperature fiber Bragg gratings can be disposed in the optical fiber, wherein the plurality of temperature fiber Bragg gratings can be interspersed between the plurality of overheat fiber Bragg gratings.

A center wavelength of at least one of the plurality of overheat fiber Bragg gratings and the plurality of temperature fiber Bragg gratings can be identified based upon the detected presences of the plurality of calibration fiber Bragg gratings.

A calibration value can be assigned to the line replaceable unit based upon the detected presences of the plurality of calibration fiber Bragg gratings; and/or the calibration value of the line replaceable unit can be communicated to a controller operatively connected to the optical receiver of the first interrogator.

Calibration values for all of the fiber Bragg gratings of the line replaceable unit can be identified.

A distance from the first interrogator to at least one of the plurality of calibration fiber Bragg gratings can be determined based upon the calibration value.

A center wavelength for each of the fiber Bragg gratings can be identified based upon the calibration value.

A detection system includes a line replaceable unit, a first interrogator, a second interrogator, and a controller. The line replaceable unit includes first and second connectors in optical communication, and an optical fiber extending between the first and second connectors. A first end of the optical fiber is connected to the first connector. The optical fiber includes a plurality of overheat fiber Bragg gratings, a first timing fiber Bragg grating, and a plurality of calibration fiber Bragg gratings. The first timing fiber Bragg grating is configured to indicate at least one of a start point and end point of the line replaceable unit. The plurality of calibration fiber Bragg gratings are located in a pattern that provides information related to a calibration value of the line replaceable unit based upon a center wavelength of each of the first plurality of overheat fiber Bragg gratings. The first interrogator is connected to the line replaceable unit at the first end of the optical fiber and is configured to provide a first optical signal to the optical fiber and to receive a first optical response signal from the optical fiber. The second interrogator is connected to the second end of the optical fiber and is configured to provide a second optical signal to the optical fiber and to receive a second optical response signal from the optical fiber. The controller is operatively connected to the first interrogator and is configured to determine the calibration value of the line replaceable unit.

The system of the preceding paragraph can optionally include, additionally and/or alternatively, any one or more of the following features, configurations and/or additional components.

The detection system can be configured to be installed in an aircraft.

The controller can be configured to control the optical transmitter and/or to determine the at least one temperature for each of the plurality of zones using at least one of time division multiplexing (TDM) and wavelength division multiplexing (WDM).

An optical transmitter can be configured to provide the optical signal to the optical fiber; a first detector can be configured to receive a response signal from the optical fiber; and/or a coupler can be connected to the optical transmitter and to the detector.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system configured to monitor a plurality of zones of an aircraft, the system comprising:
   a line replaceable unit comprising:
      first and second connectors in optical communication; and
      an optical fiber extending between the first and second connectors, the optical fiber with first and second ends, wherein the first end of the optical fiber is connected to the first connector, wherein the optical fiber comprises:
         a first plurality of fiber Bragg gratings disposed in the optical fiber; and
         a plurality of calibration fiber Bragg gratings located in a pattern that provides information related to a calibration value of the line replaceable unit based upon a center wavelength of each of the first plurality of fiber Bragg gratings;
   a first interrogator connected to the line replaceable unit at the first end of the optical fiber, wherein the first interrogator is configured to provide a first optical signal to the optical fiber and to receive a first optical response signal from the optical fiber;
   a controller operatively connected to the first interrogator and configured to determine the calibration value of the line replaceable unit based on the first optical response signal;

a second optical transmitter different from the first optical transmitter, wherein the second optical transmitter is optically connected to the same optical fiber that the first optical transmitter is connected to, wherein the second optical transmitter is configured to provide a second optical signal to the optical fiber, wherein the second optical transmitter is disposed in a second interrogator different from the first interrogator, wherein the second interrogator is connected to the second end of the same optical fiber that the first interrogator is connected to, wherein the second interrogator is configured to provide the second optical signal to the optical fiber and to receive a second optical response signal from the optical fiber.

2. The system of claim 1, wherein the first plurality of fiber Bragg gratings comprises:
a plurality of overheat fiber Bragg gratings disposed in the optical fiber.

3. The system of claim 2, wherein the plurality of calibration fiber Bragg gratings are further configured to indicate a first calibration value, wherein the first calibration value is based upon center wavelengths of the plurality of overheat fiber Bragg gratings.

4. The system of claim 1, wherein the first interrogator further comprises:
an optical transmitter configured to provide an optical signal to the optical fiber; and
a first detector configured to receive an optical response signal from the optical fiber, wherein the first detector is operatively connected to the controller.

5. The system of claim 1, wherein the system comprises a plurality of line replaceable units disposed throughout the plurality of zones of the aircraft.

6. The system of claim 1, wherein the first plurality of fiber Bragg gratings further comprises:
a plurality of temperature fiber Bragg gratings disposed in the optical fiber, wherein the plurality of temperature fiber Bragg gratings are interspersed between the plurality of overheat fiber Bragg gratings.

7. The system of claim 6, wherein the plurality of temperature fiber Bragg gratings are further configured to indicate a second calibration value, wherein the second calibration value is based upon center wavelengths of the plurality of temperature fiber Bragg gratings.

8. A method of calibrating a fiber optic system, the method comprising:
emitting, by a first optical transmitter disposed in a first interrogator connected to an optical fiber, a first optical signal into the optical fiber, wherein the optical fiber comprises:
a plurality of overheat fiber Bragg gratings disposed in the optical fiber; and
a plurality of calibration fiber Bragg gratings disposed in the optical fiber;
reflecting the first optical signal with at least one of the plurality of calibration fiber Bragg gratings to create a first response signal;
receiving, by a first optical receiver in the first interrogator, the first response signal from the optical fiber based upon the reflected first optical signal;
detecting the received first response signal to identify presences of each of the plurality of calibration fiber Bragg gratings;
emitting, by a second optical transmitter disposed in a second interrogator that is different from the first interrogator, a second optical signal into the optical fiber;
reflecting the second optical signal with at least one of the plurality of calibration fiber Bragg gratings to create a second response signal;
receiving, by a second optical receiver in the second interrogator, a second response signal from the optical fiber based upon the second optical signal;
detecting the received second response signal to further identify presences of each of the plurality of calibration fiber Bragg gratings; and
determining a calibration value based upon the identified presences of the plurality of calibration fiber Bragg gratings.

9. The method of claim 8, wherein the system further comprises a plurality of temperature fiber Bragg gratings disposed in the optical fiber, wherein the plurality of temperature fiber Bragg gratings are interspersed between the plurality of overheat fiber Bragg gratings.

10. The method of claim 9, further comprising:
identifying a center wavelength of at least one of the plurality of overheat fiber Bragg gratings and the plurality of temperature fiber Bragg gratings based upon the detected presences of the plurality of calibration fiber Bragg gratings.

11. The method of claim 8, wherein determining a calibration value further comprises:
assigning a calibration value to a line replaceable unit based upon the detected presences of the plurality of calibration fiber Bragg gratings; and
communicating the calibration value of the line replaceable unit to a controller operatively connected to the optical receiver of the first interrogator.

12. The method of claim 8, further comprising identifying calibration values for all of the fiber Bragg gratings of a line replaceable unit.

13. The method of claim 8, further comprising determining a distance from the first interrogator to at least one of the plurality of calibration fiber Bragg gratings based upon the calibration value.

14. The method of claim 8, further comprising identifying a center wavelength for each of the fiber Bragg gratings based upon the calibration value.

15. A detection system comprising:
a line replaceable unit comprising:
first and second connectors in optical communication; and
an optical fiber extending between the first and second connectors, the optical fiber with first and second ends, wherein the first end of the optical fiber is connected to the first connector, wherein the optical fiber comprises:
a plurality of overheat fiber Bragg gratings disposed in the optical fiber;
a first timing fiber Bragg grating disposed in the optical fiber, wherein the first timing fiber Bragg grating is configured to indicate at least one of a start point and end point of the line replaceable unit;
a plurality of calibration fiber Bragg gratings located in a pattern that provides information related to a calibration value of the line replaceable unit based upon a center wavelength of each of the first plurality of overheat fiber Bragg gratings;
a first interrogator connected to the line replaceable unit at the first end of the optical fiber, wherein the first interrogator is configured to provide a first optical signal to the optical fiber and to receive a first optical response signal from the optical fiber;

a second interrogator different from the first interrogator, wherein the second interrogator is connected to the second end of the same optical fiber that the first interrogator is connected to, wherein the second interrogator is configured to provide a second optical signal to the optical fiber and to receive a second optical response signal from the optical fiber; and a controller operatively connected to the first interrogator and configured to determine the calibration value of the line replaceable unit based on the first optical response signal.

16. The detection system of claim 15, wherein the overheat detection system is configured to be installed in an aircraft.

17. The detection system of claim 15, wherein the controller is configured to control the optical transmitter and determine the at least one temperature for each of the plurality of zones using at least one of time division multiplexing (TDM) and wavelength division multiplexing (WDM).

18. The detection system of claim 15, wherein the first interrogator further comprises:
   an optical transmitter configured to provide the optical signal to the optical fiber;
   a first detector configured to receive a response signal from the optical fiber; and
   a coupler connected to the optical transmitter and to the detector.

* * * * *